(12) United States Patent
Komano et al.

(10) Patent No.: US 9,537,653 B2
(45) Date of Patent: Jan. 3, 2017

(54) ENCRYPTION KEY GENERATING APPARATUS AND COMPUTER PROGRAM PRODUCT

(71) Applicants: Yuichi Komano, Kanagawa (JP); Kazuo Ohta, Tokyo (JP); Kazuo Sakiyama, Tokyo (JP)

(72) Inventors: Yuichi Komano, Kanagawa (JP); Kazuo Ohta, Tokyo (JP); Kazuo Sakiyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/710,694

(22) Filed: Dec. 11, 2012

(65) Prior Publication Data
US 2013/0156183 A1   Jun. 20, 2013

(30) Foreign Application Priority Data

Dec. 16, 2011   (JP) .................................. 2011-275637

(51) Int. Cl.
*H04L 9/00*   (2006.01)
*H04L 9/08*   (2006.01)
*G06F 21/31*   (2013.01)

(52) U.S. Cl.
CPC .......... *H04L 9/0861* (2013.01); *H04L 9/0866* (2013.01)

(58) Field of Classification Search
CPC ................ H04L 9/0861; H04L 9/0866; H04L 2209/805; H04L 9/002; H04L 9/3271; H04L 9/3278; H04L 2209/12; G06F 21/31; G06F 2221/2129; G06F 21/73

USPC .......................................................... 380/44
See application file for complete search history.

(56) References Cited

U.S. PATENT DOCUMENTS

| | | | |
|---|---|---|---|
| 6,606,385 B1 * | 8/2003 | Aikawa ................. | H04L 9/0625 380/28 |
| 2002/0046382 A1 * | 4/2002 | Yang ..................... | H03M 13/03 714/758 |
| 2009/0083833 A1 * | 3/2009 | Ziola ...................... | G06F 21/31 726/2 |

(Continued)

OTHER PUBLICATIONS

"Secure and Robust Error Correction for Physical Unclonable Functions" Meng-Day (Mandel) Yu, 2010 IEEE.*

(Continued)

*Primary Examiner* — Linglan Edwards
*Assistant Examiner* — Gary Gracia
(74) *Attorney, Agent, or Firm* — Finnegan, Henderson, Farabow, Garrett & Dunner LLP

(57) ABSTRACT

According to an embodiment, an encryption key generating apparatus includes a converting unit to convert input data using a physically unclonable function and outputs output data; a memory to store a plurality of pattern data, each of which is a partial data in the output data indicated by one of a plurality of index data; a generating unit to generates an encryption key on the basis of the plural of index data; and a comparing unit to compare the output data with the plural of pattern data to detect plural of locations in the output data at which partial data similar to the plural of pattern data is present. The generating unit reproduces, as the plural of index data, the plural of locations detected by the comparing unit and reproduces the encryption key on the basis of the plural of index data that have been reproduced.

3 Claims, 12 Drawing Sheets

(56) References Cited

U.S. PATENT DOCUMENTS

| | | | |
|---|---|---|---|
| 2011/0033041 A1* | 2/2011 | Yu | G06F 11/10 380/28 |
| 2011/0286599 A1* | 11/2011 | Tuyls | G06F 21/602 380/278 |
| 2012/0072737 A1* | 3/2012 | Schrijen | H04L 9/3278 713/189 |
| 2012/0179952 A1* | 7/2012 | Tuyls | G06F 21/73 714/768 |
| 2012/0183135 A1* | 7/2012 | Paral | G09C 1/00 380/44 |
| 2012/0324310 A1* | 12/2012 | Oshida | H04L 9/3278 714/755 |
| 2013/0142329 A1* | 6/2013 | Bell | H04L 9/0866 380/44 |
| 2013/0254636 A1* | 9/2013 | Kirkpatrick | H04L 9/0866 714/784 |

OTHER PUBLICATIONS

"On Foundation and Construction of Physical Unclonable Functions" J. Wu and M. O'Neill, 2010.*
Secure and Robust Error Correction for Physical Unclonable Functions, Meng-Day, 2010.*
"Secure and Robust Error Correction for Physical Unclonable Functions" Meng-Day (Mandel ) Yu published by IEEE 2010.*
Paral, Z. S. et al., "Reliable and Efficient PUF-Based Key Generation Using Pattern Matching," 2011 IEEE International Symposium on Hardware-Oriented Security and Trust, pp. 128-133, (2011).
Notice of Rejection mailed by the Japanese Patent Office on Sep. 16, 2014, in counterpart Japanese Patent Application No. 2011-275637.

* cited by examiner

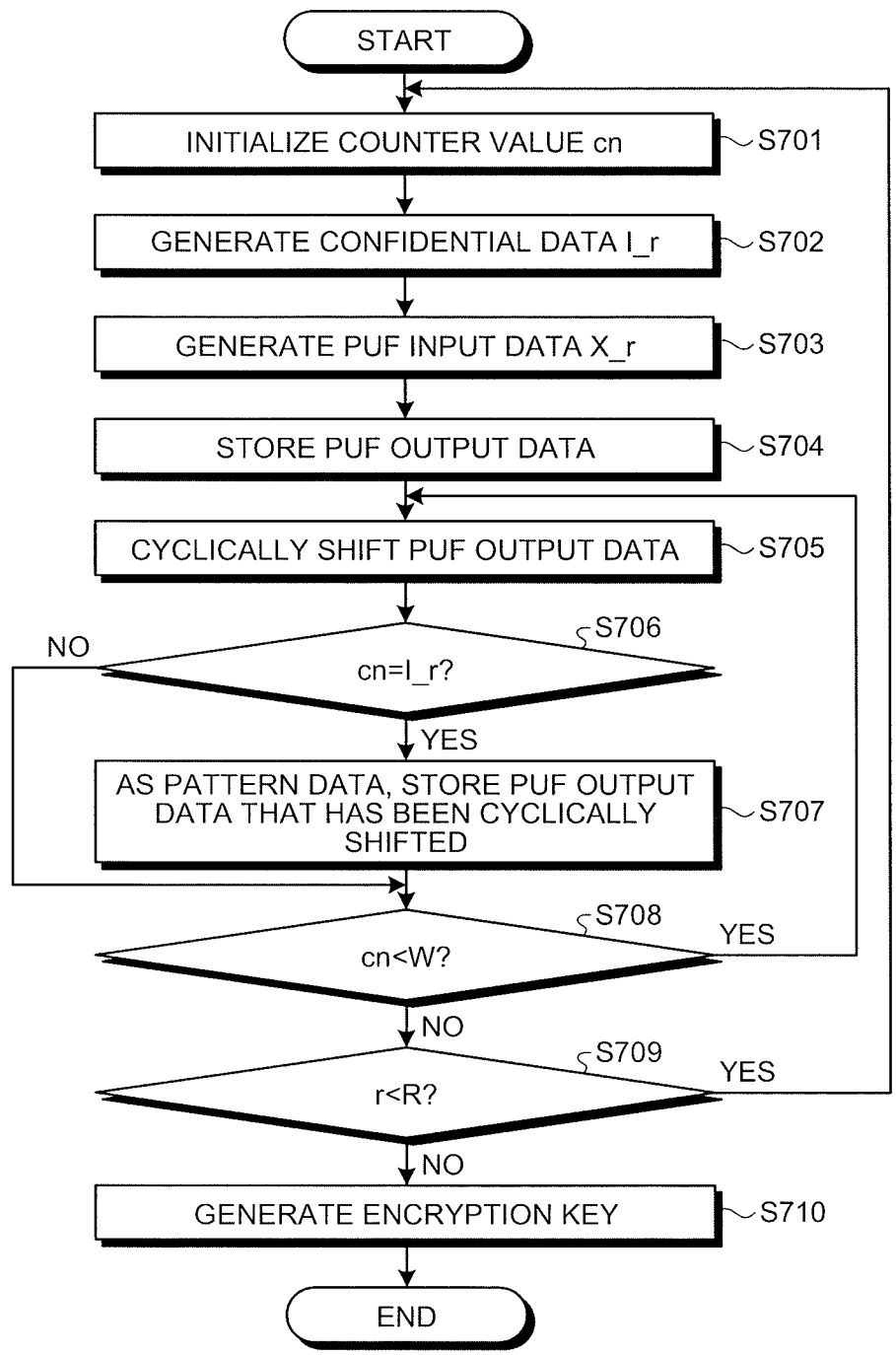

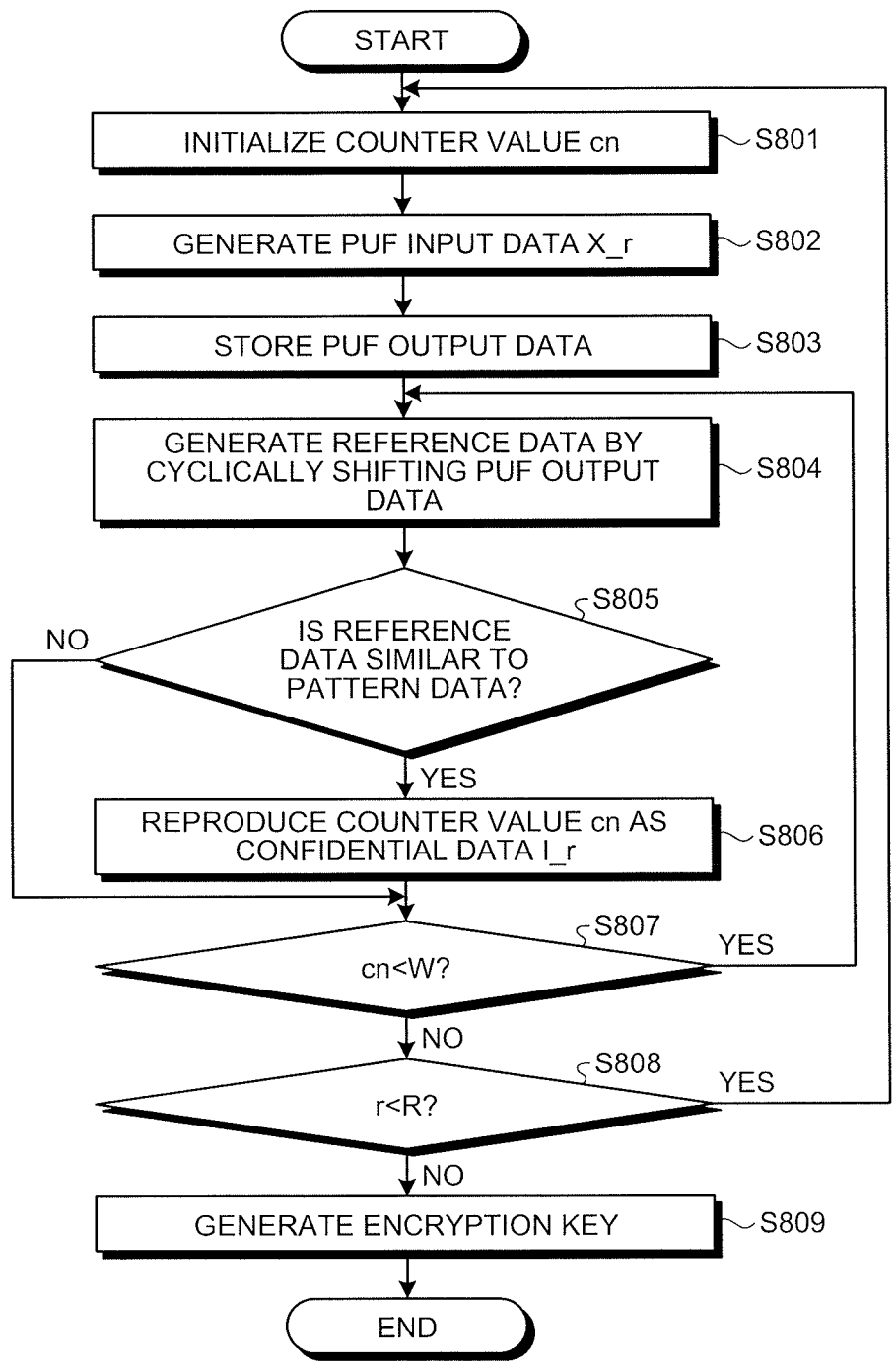

ENCRYPTION KEY GENERATING APPARATUS AND COMPUTER PROGRAM PRODUCT

CROSS-REFERENCE TO RELATED APPLICATIONS

This application is based upon and claims the benefit of priority from Japanese Patent Application No. 2011-275637, filed on Dec. 16, 2011; the entire contents of which are incorporated herein by reference.

FIELD

Embodiments described herein relate generally to an encryption key generating apparatus and a computer program product.

BACKGROUND

A cryptographic protocol makes use of an encryption key or an authentication key (hereinafter, collectively referred to as "encryption key"), and implements the functions of confidentiality and authentication. A cryptographic protocol needs to make use of an encryption key that is generated in a confidential manner. As a method of enhancing the confidentiality of an encryption key, a method is known by which the encryption key is generated with the use of a physically unclonable function (PUF).

A physically unclonable function outputs a device-specific value from the same input. An encryption key generated with the use of a physically unclonable function is difficult to clone in an external device. For that reason, a physically unclonable function is receiving attention as the elemental technology in key generation and authentication. Even when an encryption key is generated with the use of a physically unclonable function, it is still necessary to ensure that the encryption key is generated in an efficient fashion.

BRIEF DESCRIPTION OF THE DRAWINGS

FIG. 11 is a flowchart for explaining a sequence of operations performed during an encryption key setting operation according to the second example; and FIG. 12 is a flowchart for explaining a sequence of operations performed during an encryption key reproducing operation according to the second example.

DETAILED DESCRIPTION

Figure 1:
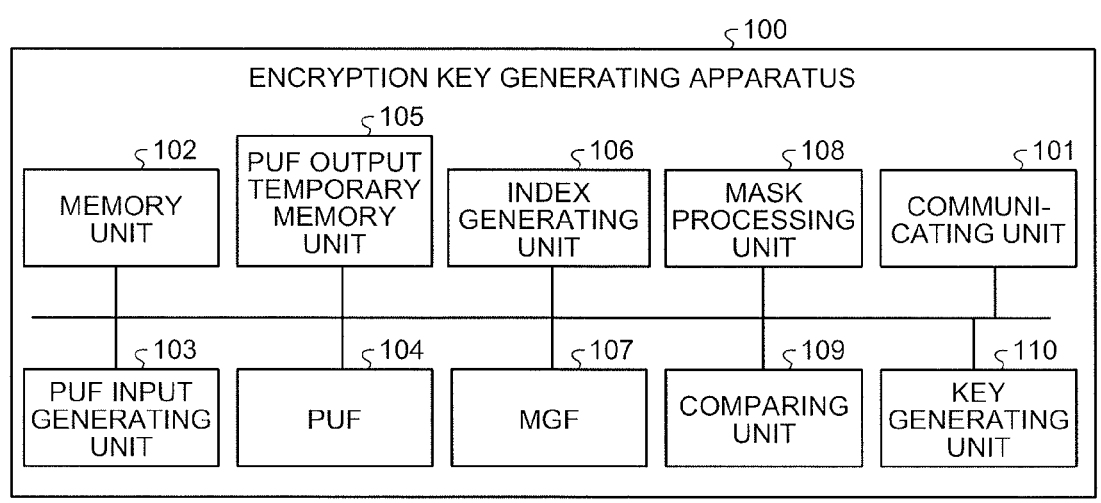
FIG. 1 is a functional block diagram illustrating an encryption key generating apparatus according to a first embodiment.

According to an embodiment, an encryption key generating apparatus includes a converting unit configured to convert input data with the use of a physically unclonable function and outputs output data; a memory to store a plurality of pattern data, each of which is a partial data in the output data indicated by one of a plurality of index data; and a comparing unit configured to compare the output data with the plurality of pattern data so as to detect a plurality of locations in the output data at which partial data similar to the plurality of pattern data is present. The generating unit reproduces, as the plurality of index data, the plurality of locations detected by the comparing unit and reproduces the encryption key on the basis of the plurality of index data that have been reproduced.

An encryption key generating apparatus according to embodiments has the function of performing two operations, namely, an encryption key setting operation and an encryption key reproducing operation. The encryption key setting operation is performed to initially generate an encryption key. When the encryption key generated during the encryption key generating operation is required, the encryption key reproducing operation is performed to reproduce the encryption key. Thus, the encryption key setting operation is performed to generate an original encryption key; while the encryption key reproducing operation is performed to generate the same encryption key as the original encryption key. That is, the encryption key generation is a concept that includes the encryption key setting operation as well as the encryption key reproducing operation.

First Embodiment

General Description

First of all, an overview of an encryption key generating apparatus according to a first embodiment is explained. During the encryption key setting operation, the encryption key generating apparatus according to the first embodiment generates an encryption key with the use of index data that indicates location of partial data; and stores pattern data which is partial data in the PUF output indicated by the index data that is used in generating the encryption key. Moreover, during the encryption key reproducing operation, the encryption key generating apparatus according to the first embodiment searches for the locations of the PUF output that are similar to the pattern data that has been stored (i.e., perform pattern matching) and reproduces the index data, which was used in generating the encryption key during the encryption key setting operation, as well as reproduces the encryption key.

The index data that is used in generating an encryption key contains only a small amount of information. Hence, it is necessary to combine a number of index data to generate a single encryption key. In that regard, the encryption key generating apparatus according to the first embodiment generates a single encryption key by repeatedly performing a round operation. At that time, in order to ensure that the PUF output is used in an efficient manner and that the number of repetitions of the round operation is reduced, the encryption key generating apparatus according to the first embodiment processes a plurality of index data in a single round.

Meanwhile, if a plurality of partial data in PUF output of a single round are stored with no change, then that may lead to overlapping of data and may make the mutual relationship between the index data guessable. In that regard, in the encryption key generating apparatus according to the first embodiment, a mask generation function (MGF) is used to add a different data (mask data) to each of pattern data that will be stored. That enables achieving enhancement in the confidentiality of the index data which is used in generating the encryption key.

Configuration

Explained below with reference to FIG. 1 is an overall configuration of the encryption key generating apparatus according to the first embodiment. FIG. 1 is a functional block diagram illustrating a functional configuration of an encryption key generating apparatus 100 according to the first embodiment.

As illustrated in FIG. 1, the encryption key generating apparatus 100 according to the first embodiment includes a communicating unit 101, a memory unit 102, a PUF input generating unit 103, a PUF 104, a PUF output temporary memory unit 105, an index generating unit 106, an MGF 107, a mask processing unit 108, a comparing unit 109, and a key generating unit 110.

The communicating unit 101 is an interface that enables communication between the encryption key generating apparatus 100 and an external system.

The memory unit 102 is a memory used to store therein deformation pattern data (described later) that is generated by the mask processing unit 108 during the encryption key setting operation. The memory unit 102 is configured with, for example, a random access memory (RAM) or an electronically erasable and programmable read only memory (EEPROM) (registered trademark). Meanwhile, the memory unit 102 can be installed on the outside of the encryption key generating apparatus 100. When the memory unit 102 is installed on the outside of the encryption key generating apparatus 100, the constituent elements of the encryption key generating apparatus 100 perform data reading and data writing with respect to the memory unit 102 via the communicating unit 101.

The PUF input generating unit 103 generates PUF input data, which is to be input to the PUF 104, on the basis of a predetermined initial value I_{0, 1} or on the basis of index data I_{r, j} that is output by the index generating unit 106. For example, in order to ensure that the PUF input data has a predetermined length, the PUF input generating unit 103 concatenates predetermined data either to the initial value I_{0, 1} or to the index data I_{r, j} so as to generate the PUF input data. Alternatively, the PUF input generating unit 103 can input either the initial value I_{0, 1} or the index data I_{r, j} to a hash function and generate the PUF input data. Still alternatively, when the PUF input generating unit 103 receives input of a plurality of data, the PUF input generating unit 103 can either concatenate the input data or perform bit operations or arithmetic operations to generate the PUF input data. Moreover, in addition to inputting the initial value I_{0, 1} or the index data I_{r, j}, the PUF input generating unit 103 can also input a round number r (described later), or a bit count cn (described later) of the bits output by the PUF 104, or a clock cycle number (not described) at the time of circuit operations.

The PUF 104 is a physically unclonable function. When a device is mounted, the physically unclonable function outputs a value specific to that device from the same input. An encryption key generating apparatus disclosed in Zdenek (Sid) Paral and Srinivas Devadas, "Reliable and Efficient PUF-Based Key Generation Using Pattern Matching", 2011 IEEE International Symposium on Hardware-Oriented Security and Trust (HOST 2011) (hereinafter, referred to as "Literature 1") makes use of a value obtained by performing an exclusive OR operation with respect to the output of a plurality of PUFs. In the following explanation, the PUF 104 can be a circuit that outputs a value by performing an exclusive OR operation with respect to a plurality of PUFs and the output thereof, or can be a circuit that outputs a value by performing bit operations or arithmetic operations with respect to a plurality of PUFs and the output thereof. In each round, the PUF 104 receives input of the PUF input data generated by the PUF input generating unit 103 and outputs PUF output data having L+W−1 bits.

The PUF output temporary memory unit 105 is used to temporarily store therein the PUF output data that is output in each round by the PUF 104. Herein, in each round, of the PUF output data having L+W−1 bits, the encryption key generating apparatus 100 according to the first embodiment makes use of W-bit data (partial data) as pattern data. In the first embodiment, the PUF output temporary memory unit 105 is configured with, for example, a register having L+W−1 bits, and is used to hold the PUF output data having L+W−1 bits as output in each round by the PUF 104. Then, of the PUF output data having L+W−1 bits stored in the PUF output temporary memory unit 105, the mask processing unit 108 (described later) makes use of W-bit data. Alternatively, as described later in a first example, the PUF output temporary memory unit 105 is configured with a shift register having W bits; and, every time a single bit is output by the PUF 104, destroys the oldest single bit from among the bits stored therein.

In each round, the index generating unit 106 generates, in between 1 to L, N_r number (where 1≤N_r and r represents round number) of index data, namely, index data I_{r, 1} to index data I_{r, N_r}. Each of index data I_{r, j} (where 1≤j≤N_r) can either be randomly selected in between 1 to L or be selected in such a way that, for an arbitrary j and an arbitrary k, the index data I_{r, j} is spaced apart from the index data I_{r, k} by W or more. Alternatively, each of index data I_{r, j} can be received as a predetermined value by the communicating unit 101 from the outside of the encryption key generating apparatus 100. In the case receiving each of index data I_{r, j} from the outside, the encryption key generating apparatus 100 need not include the index generating unit 106. The index data I_{r, j} points to a location of pattern data in the PUF output data. In the first embodiment, the explanation is given for a case when the index data I_{r, j} points to the beginning location of the pattern data in the PUF output data. However, the location of the pattern data is not limited to the beginning location, and it is also possible that the index data I_{r, j} points to a predetermined location of the pattern data.

The MGF 107 is a mask generation function that, either based on the predetermined initial value I_{0, 1} or based on the index data I_{r, j} output by the index generating unit 106, generates mask data that is to be added to the pattern data. In each round, the encryption key generating apparatus 100 according to the first embodiment makes use of N_r number of mask data, namely, mask data M_{r, 1} to M_{r, N_r}. From the perspective of hardware implementation, in order to concurrently generate a plurality of mask data, a plurality of MGFs 107 may be disposed in the encryption key generating apparatus 100 (in FIG. 1, only a single MGF 107 is illustrated). Alternatively, a single MGF 107 can be used for $N\_r$ number of times to generate $N\_r$ number of mask data. Meanwhile, the MGF 107 can be configured to partially or entirely perform the same operations as the PUF input generating unit 103. In the case when the MGF 107 performs same operations as that of the PUF input generating unit 103; regarding the portions used in performing the same operations, the PUF input generating unit 103 and the MGF 107 can be configured with a single device (when exactly the same operations are performed, the PUF input generating unit 103 and the MGF 107 are configured with a single device in entirety). Moreover, in addition to inputting the initial value $I\_\{0, 1\}$ or the index data $I\_\{r, j\}$, the MGF 107 can also input the round number r or a number in between 1 to $N\_r$.

Of the PUF output data having $L+W-1$ bits stored in the PUF output temporary memory unit 105, the mask processing unit 108 adds the mask data $M\_\{r, j\}$ generated by the MGF 107 to pattern data $Y\_\{r, j\}$, which is the W-bit data starting from the location indicated by the index data $I\_\{r, j\}$, and generates deformation pattern data $Z\_\{r, j\}$. For example, when the mask data $M\_\{r, j\}$ has W bits, the mask processing unit 108 can generate the deformation pattern data $Z\_\{r, j\}$ by performing an exclusive OR operation with respect to the pattern data $Y\_\{r, j\}$ and the mask data $M\_\{r, j\}$. Alternatively, the mask processing unit 108 can generate the deformation pattern data $Z\_\{r, j\}$ from the pattern data $Y\_\{r, j\}$ and the mask data $M\_\{r, j\}$ by following predetermined rules. From the perspective of hardware implementation, in order to concurrently perform a plurality of sets of mask operations, a plurality of mask processing units 108 may be disposed in the encryption key generating apparatus 100 (in FIG. 1, only a single mask processing unit 108 is illustrated). Alternatively, a single mask processing unit 108 can be used for $N\_r$ number of times to generate $N\_r$ number of deformation pattern data, namely, deformation pattern data $Z\_\{r, 1\}$ to deformation pattern data $Z\_\{r, N\_r\}$.

During the encryption key reproducing operation, the comparing unit 109 determines whether or not the data that is obtained by adding the mask data $M\_\{r, j\}$ generated by the MGF 107 to the W-bit data from among the PUF output data stored in the PUF output temporary memory unit 105 (hereinafter, referred to as "reference data") is similar to the deformation pattern data that is stored in the memory unit 102. The determination of similar data is performed by, for example, determining whether or not the Hamming distance (i.e., the number of different bits) between the two data to be compared is equal to or smaller than a predetermined threshold value T. Alternatively, the determination of similar data can be performed by determining whether or not the two data contain an identical partial series of a predetermined length. From the perspective of hardware implementation, in order to concurrently perform a plurality of determining operations, a plurality of comparing units 109 may be disposed in the encryption key generating apparatus 100 (in FIG. 1, only a single comparing unit 109 is illustrated). Alternatively, a single comparing unit 109 can be used for $N\_r$ number of times to perform the determining operation in a repeated manner.

The key generating unit 110 generates an encryption key with the use of a collection of index data $\{I\_\{r, j\}\}\_\{r, j\}$ of $N\_1+ \ldots +N\_R$ number of index data. For example, the key generating unit 110 can generate an encryption key either by concatenating all of index data $I\_\{r, j\}$ included in the collection of index data $\{I\_\{r, j\}\}\_\{r, j\}$ or by performing bit operations or arithmetic operations with respect to the index data $I\_\{r, j\}$ included in the collection of index data $\{I\_\{r, j\}\}\_\{r, j\}$.

Given below is the explanation of the symbols that represent constant numbers used in the first embodiment. "L" represents the maximum value of the index data $I\_\{r, j\}$ that is generated by the index data generating unit 106. "W" represents the bit length of the data used as the pattern data $Y\_\{r, j\}$ from among the PUF output data that is output by the PUF 104. "$N\_r$" represents the number of index data $I\_\{r, j\}$, which is generated by the index data generating unit 106, in the r-th round. Herein, for each round, "$N\_r$" can either be different or be identical. "R" represents the total number of rounds carried out during the encryption key generating operation and the encryption key reproducing operation. "$I\_\{0, 1\}$" represents the initial value of the data that is input to the PUF input generating unit 103.

The encryption key generating apparatus 100 according to the first embodiment can have the hardware configuration of a commonplace computer that includes, for example, a processing device such as a central processing unit (CPU), a memory device such as a read only memory (ROM) or a random access memory (RAM), an external memory device such as a hard disk drive (HDD) or a compact disk (CD) drive device, and a communicating device. The computer executes a computer program in such a way that the above-mentioned hardware resources are used to implement the constituent elements including the communicating unit 101, the memory unit 102, the PUF input generating unit 103, the PUF 104, the PUF output temporary memory unit 105, the index generating unit 106, the MGF 107, the mask processing unit 108, the comparing unit 109, and the key generating unit 110.

Encryption Key Setting Operation

Figure 2:
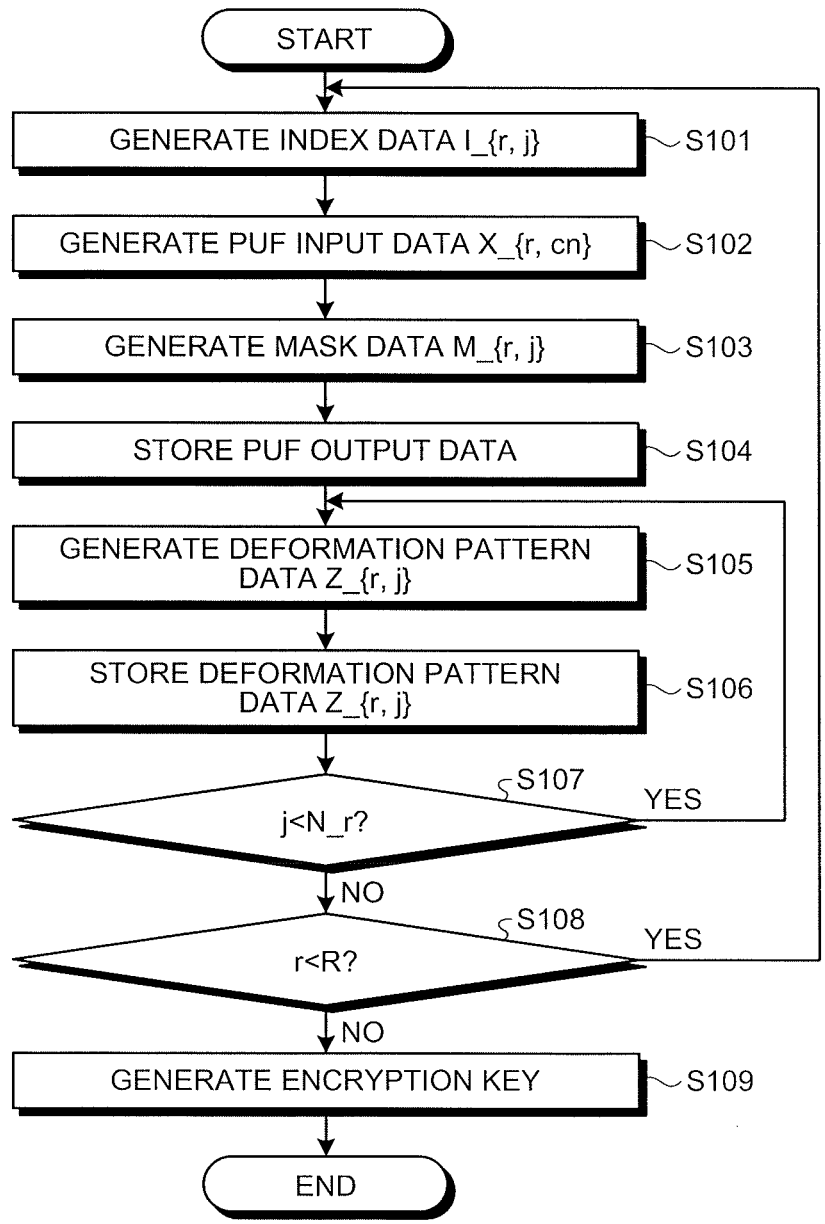
FIG. 2 is a flowchart for explaining a sequence of operations performed during an encryption key setting operation according to the first embodiment.

Explained below with reference to FIG. 2 is the encryption key setting operation performed in the encryption key generating apparatus 100 according to the first embodiment. FIG. 2 is a flowchart for explaining a sequence of operations performed during the encryption key setting operation in the encryption key generating apparatus 100.

The encryption key setting operation illustrated in the flowchart in FIG. 2 is started when the encryption key generating apparatus 100 receives an instruction to start the encryption key setting operation. Upon receiving the instruction to start the encryption key setting operation, the encryption key generating apparatus 100 initializes the round number r to "1" and repeats the following operations with respect to each of the round number r=1 to the round number r=R.

The index generating unit 106 generates $N\_r$ number of index data, namely, index data $I\_\{r, 1\}$ to index data $I\_\{r, N\_r\}$ (Step S101). As long as the operation performed at Step S101 is performed before Step S104 (described later) at which the (W−1)-th bit of the PUF output data, which is output by the PUF 104 in the r-th round, is stored in the PUF output temporary memory unit 105, the purpose is served. For example, the operation performed at Step S101 can be performed before the start of the operations for the r-th round.

The PUF input generating unit 103 considers, as the input, either a predetermined initial value or index data $\{I\_\{i, j\}\}\_\{0 \leq i \leq r, 1 \leq j \leq N\_r\}$ generated by the index data generating unit 106 at Step S101; and generates PUF input data $X\_\{r, cn\}$ that is used by the PUF 104 to output the cn-th bit in the r-th round (Step S102). As long as the operation performed at Step S102 is performed before Step S104 (described later) at which the PUF input data $X\_\{r, cn\}$ is input to the PUF 104, it serves the purpose. For example, the operation performed at Step S102 can be performed before the start of the operations for the r-th round.

Then, regarding j=1 to j=N_r, the MGF 107 generates mask data $M\_\{r, j\}$ by considering either a predetermined initial value or index data $\{I\_\{i, j\}\}\_\{0 \le i \le r, 1 \le j \le N\_r\}$, which is generated by the index generating unit 106 at Step S101, as the input as well as by considering "r" and "j" as the input (Step S103). As long as the operation performed at Step S103 is performed before Step S105 (described later) at which the mask processing unit 108 generates deformation pattern data, it serves the purpose. For example, the operation performed at Step S103 can be performed before the start of the operations for the r-th round.

The PUF output temporary memory unit 105 considers, as the input, the PUF input data $X\_\{r, cn\}$ generated by the PUF input generating unit 103 at Step S102; and stores therein the PUF output data having L+W−1 bits that is output by the PUF 104 (Step S104).

Once the PUF output data is stored in the PUF output temporary memory unit 105; then, regarding j=1 to j=N_r, the encryption key generating apparatus 100 repeatedly performs the following operations from Step S105 to Step S107 with respect to the $(I\_\{r, j\})$-th bit to the $(I\_\{r, j\}+W-1)$-th bit of the PUF output data that is stored in the PUF output temporary memory unit 105.

Herein, assume that the $(I\_\{r, j\})$-th bit to the $(I\_\{r, j\}+W-1)$-th bit of the PUF output data in the r-th round (meanwhile, $I\_\{r, j\}$ may be equal to $I\_\{r, j'\}$, where j' is different than j) is stored in the PUF output temporary memory unit 105. Then, for example, the mask processing unit 108 generates deformation pattern data $Z\_\{r, j\}$ by performing an exclusive OR operation with respect to the W-bit data of the PUF output data stored in the PUF output temporary memory unit 105 at Step S104 and the mask data $M\_\{r, j\}$ generated by the MGF 107 at Step S103 (Step S105).

Subsequently, the deformation pattern data $Z\_\{r, j\}$ generated by the mask processing unit 108 at Step S105 is stored in the memory unit 102 (Step S106).

Once the deformation pattern data $Z\_\{r, j\}$ is stored in the memory unit 102, the encryption key generating apparatus 100 determines whether or not j<N_r is satisfied (Step S107). If j<N_r is satisfied (Yes at Step S107), then the encryption key generating apparatus 100 increments j to j+1. The system control then returns to Step S105 and the subsequent operations are repeated. On the other hand, if j=N_r is satisfied (No at Step S107), then the encryption key generating apparatus 100 determines whether or not r<R is satisfied (Step S108). If r<R is satisfied (Yes at Step S108), then the encryption key generating apparatus 100 increments r to r+1. The system control then returns to Step S101 and the subsequent operations are repeated. On the other hand, if r=R is satisfied (No at Step S108), then the system control proceeds to Step S109.

Subsequently, for example, the key generating unit 110 concatenates each of index data $I\_\{i, j\}$ included in the collection of index data $\{I\_\{i, j\}\}\_\{0 \le I \le R, 1 \le j \le N\_i\}$ of N_1+ . . . +N_R number of index data, and generates an encryption key (Step S109).

Encryption Key Reproducing Operation

Figure 3:
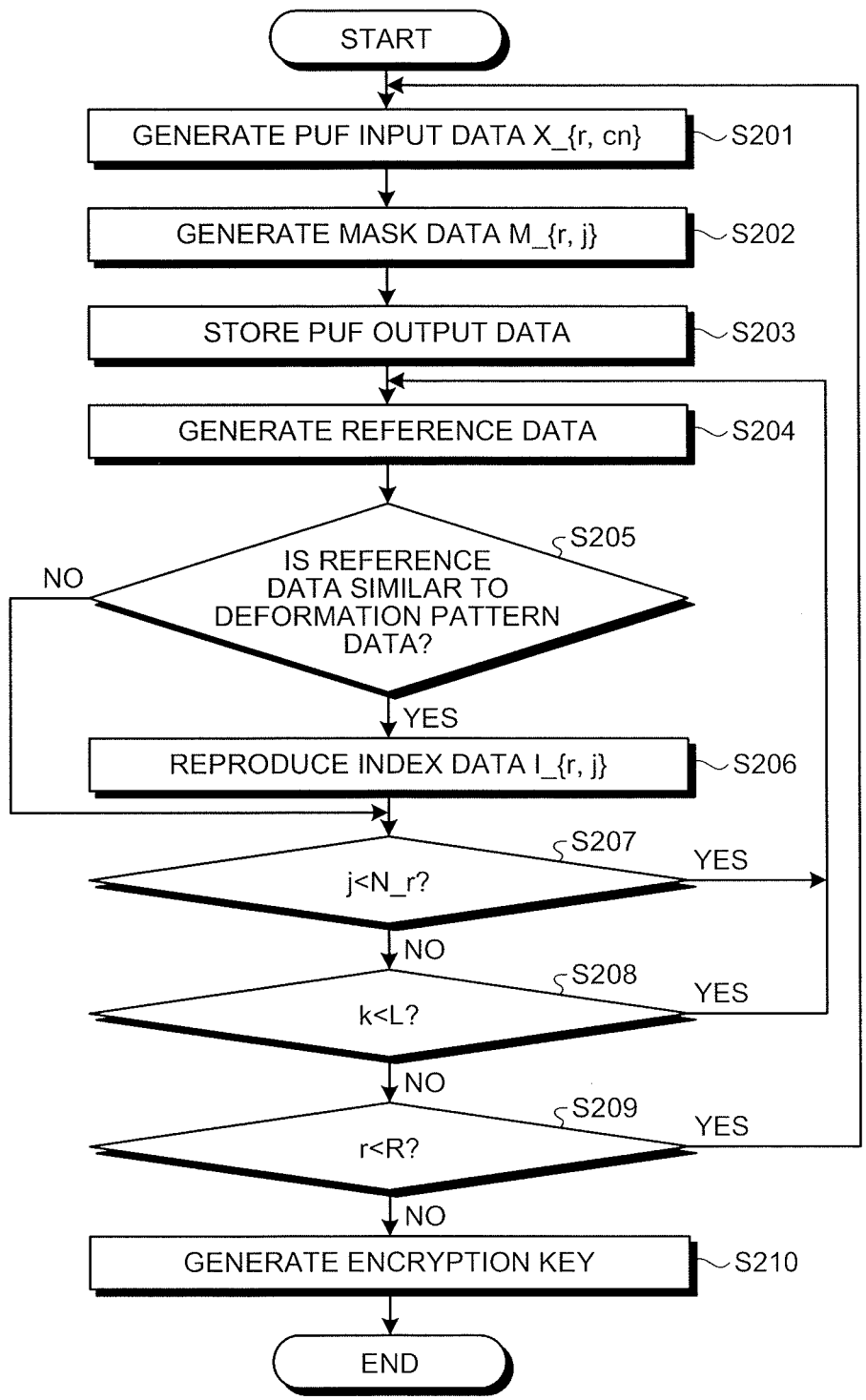
FIG. 3 is a flowchart for explaining a sequence of operations performed during an encryption key reproducing operation according to the first embodiment.

Explained below with reference to FIG. 3 is the encryption key reproducing operation performed by the encryption key generating apparatus 100 according to the first embodiment. Once the encryption key setting operation is completed as described above, the encryption key reproducing operation is performed when a cryptographic protocol demands for the encryption key. FIG. 3 is a flowchart for explaining the sequence of operations performed during the encryption key reproducing operation in the encryption key generating apparatus 100.

The encryption key reproducing operation illustrated in the flowchart in FIG. 3 is started when the encryption key generating apparatus 100 receives an instruction to start the encryption key reproducing operation. Upon receiving the instruction to start the encryption key reproducing operation, the encryption key generating apparatus 100 initializes the round number r to "1" and repeats the following operations with respect to each of the round number r=1 to the round number r=R.

The PUF input generating unit 103 considers, as the input, either a predetermined initial value or the index data $\{I\_\{i, j\}\}\_\{0 \le i \le r, 1 \le j \le N\_r\}$ that was reproduced in the previous round operation; and generates the PUF input data $X\_\{r, cn\}$ that is used by the PUF 104 to output the cn-th bit in the r-th round (Step S201). As long as the operation performed at Step S201 is performed before Step S203 (described later) at which the PUF input data $X\_\{r, cn\}$ is input to the PUF 104, the purpose is served. For example, the operation performed at Step S201 can be performed before the start of the operations for the r-th round.

Then, regarding j=1 to j=N_r, the MGF 107 generates mask data $M\_\{r, j\}$ by considering either a predetermined initial value or the index data $\{I\_\{i, j\}\}\_\{0 \le i \le r, 1 \le j \le N\_r\}$, which was reproduced in the previous round operation, as the input as well as by considering "r" and "j" as the input (Step S202). As long as the operation performed at Step S202 is performed before Step S204 (described later) at which the mask processing unit 108 generates reference data to be subjected to pattern matching, it serves the purpose. For example, the operation performed at Step S202 can be performed before the start of the operations for the r-th round.

The PUF output temporary memory unit 105 considers, as the input, the PUF input data $X\_\{r, cn\}$ generated by the PUF input generating unit 103 at Step S201; and stores therein the PUF output data output by the PUF 104 (Step S203).

Once the PUF output data is stored in the PUF output temporary memory unit 105; then, regarding k=1 to k=L, the encryption key generating apparatus 100 repeatedly performs the following operations from Step S204 to Step S208 with respect to the k-th bit to the (k+W−1)-th bit stored in the PUF output temporary memory unit 105. Moreover, regarding j=1 to j=N_r, the encryption key generating apparatus 100 repeatedly performs the following operations from Step S204 to Step S207.

Then, for example, the mask processing unit 108 generates reference data by performing an exclusive OR operation with respect to the W-bit data, starting from the k-th bit to the (k+W−1)-th bit of the PUF output data stored in the PUF output temporary memory unit 105, and the mask data $M\_\{r, j\}$ generated by the MGF 107 at Step S202 (Step S204).

Subsequently, the comparing unit 109 determines whether or not the reference data generated by the mask processing unit 108 at Step S204 is similar to the deformation pattern data $Z\_\{r, j\}$ stored in the memory unit 102 (Step S205). Herein, although it is determined whether or not the reference data, which is obtained by adding the mask data to the W-bit data of the PUF output data, is similar to the deformation pattern data stored in the memory unit 102; that is not the only possible case. Alternatively, the pattern data may be reproduced by adding the mask data to the deformation pattern data stored in the memory unit 102, and it can be determined whether or not the W-bit data of the PUF output data that does not have the mask data added thereto is similar to the pattern data that has been reproduced.

If the comparing unit 109 determines that the two data are similar (Yes at Step S205), then the encryption key generating apparatus 100 reproduces the index data $I\_\{r, j\}$ by considering $I\_\{r, j\}=k$ (Step S206). That is, as the index data $I\_\{r, j\}$, the encryption key generating apparatus 100 reproduces the start location k of the reference data, which is determined to be similar to the deformation pattern data $Z\_\{r, j\}$ stored in the memory unit 102, in the PUF output data. Meanwhile, alternatively, for the same k but for mutually different j and j'; it is possible to reproduce a plurality of index data by considering $I\_\{r, j\}=I\_\{r, j'\}=k$. Meanwhile, if the comparing unit 109 determines that the two data are not similar (No at Step S205), then the operation at Step S206 is not performed.

Then, the encryption key generating apparatus 100 determines whether or not $j<N\_r$ is satisfied (Step S207). If $j<N\_r$ is satisfied (Yes at Step S207), then the encryption key generating apparatus 100 increments j to j+1. The system control then returns to Step S204 and the subsequent operations are repeated. On the other hand, if $j=N\_r$ is satisfied (No at Step S207), then the encryption key generating apparatus 100 determines whether or not $k<L$ is satisfied (Step S208). If $k<L$ is satisfied (Yes at Step S208), then the encryption key generating apparatus 100 increments k to k+1. The system control then returns to Step S204 and the subsequent operations are repeated. Meanwhile, regarding k=1 to k=L, if there exists such index data $I\_\{r, j\}$ that cannot be reproduced even after repeating the operations from Step S204 to Step S208; then the encryption key generating apparatus 100 can either stop performing the operations or can set a predetermined value or a random value to the index data $I\_\{r, j\}$ that cannot be reproduced.

If the determination result at Step S208 indicates that $k=L$ is satisfied (No at Step S208), then the encryption key generating apparatus 100 determines whether or not $r<R$ is satisfied (Step S209). If $r<R$ is satisfied (Yes at Step S209), then the encryption key generating apparatus 100 increments r to r+1. The system control then returns to Step S201 and the subsequent operations are repeated. On the other hand, if $r=R$ is satisfied (No at Step S209), then the system control proceeds to Step S210.

Subsequently, for example, the key generating unit 110 concatenates the $N\_1+ \ldots +N\_R$ number of index data $\{I\_\{i, j\}\}\_\{0\le i\le R, 1\le j\ N\_i\}$ reproduced in each round, and generates an encryption key (Step S210). Alternatively, the key generating unit 110 can generate an encryption key by concatenating not the collection of index data $\{I\_\{i, j\}\}\_\{0\le i\le R, 1\le j\le N\_i\}$ but the PUF input data $\{X\_\{r, cn\}\}\_\{1\le r\le r\}$. Still alternatively, the key generating unit 110 can generate an encryption key by concatenating the PUF input data $\{X\_\{r, cn\}\}\_\{1\le r\le R\}$ in addition to concatenating the index data $\{I\_\{i, j\}\}\_\{0\le i\le R, 1\le j\le N\_i\}$. Meanwhile, the key generating unit 110 can either use the concatenated value as the encryption key or input the concatenated value in a hash function and use the obtained value as the encryption key.

In order to enhance the confidentiality of index data that is used in generating an encryption key; the encryption key generating apparatus 100 according to the first embodiment generates deformation pattern data by adding mask data to pattern data that is the (W−1)-bit data starting from the location indicated by the index data from among the PUF output data; and then stores the deformation pattern data in the memory unit 102. However, in the case when the priority is to enhance the processing speed, the encryption key generating apparatus 100 can store the pattern data in the memory unit 102. In that case, the encryption key generating apparatus 100 is configured without the MGF 107 and the mask processing unit 108. Moreover, during the encryption key setting operation, the operations at Step S103 and Step S105 illustrated in the flowchart in FIG. 2 are not performed. Instead, at Step S106, the W-bit data, starting from the $(I\_\{r, j\})$-th bit to the $(I\_\{r, j\}+W-1)$-th bit of the PUF output data stored in the PUF output temporary memory unit 105, is stored in the memory unit 102.

Furthermore, during the encryption key reproducing operation, the operations at Step S202 and Step S204 illustrated in the flowchart in FIG. 3 are not performed. Instead, at Step S205, the comparing unit 109 determines whether or not the W-bit data, starting from the k-th bit to the (k+W−1)-th bit of the PUF output data stored in the PUF output temporary memory unit 105, is similar to the pattern data stored in the memory unit 102.

Meanwhile, in the encryption key generating apparatus 100 according to the first embodiment, the PUF input generating unit 103 generates the PUF input data $X\_\{r, cn\}$, which is to be input to the PUF 104, based on the index data $I\_\{r, j\}$. However, alternatively, as the PUF input data, the PUF input generating unit 103 can also generate a fixed value that is not dependent on the index data $I\_\{r, j\}$, such as an activation signal meant for the PUF 104.

Furthermore, in the encryption key generating apparatus 100, the PUF 104 outputs the PUF output data having L+W−1 bits in each round. However, alternatively, the configuration can be such that the PUF 104 outputs the PUF output data of more than L+W−1 bits, and some of that PUF output data is used in each round. For example, PUF output data having fixed values is input to the PUF 104, and the PUF 104 outputs PUF output data having R×(L+W−1) bits. In that case, in the i-th round, of the PUF output data, the data starting from the ((i−1)×(L+W))-th bit to the (L+W−1)-th bit is stored in the PUP output temporary memory unit 105. Then, the subsequent operations are performed.

Effect of First Embodiment

Prior to explaining the effect of the first embodiment; firstly, the explanation is given regarding an overview of the method of generating an encryption key disclosed in Literature 1. In the method of generating an encryption key disclosed in Literature 1, only a single index data is taken into account in a single round. That is, in the method of generating an encryption key disclosed in Literature 1; during the encryption key setting operation a single index data $I\_i$ is selected in the i-th round. Then, of the PUF output data in the i-th round, the W-bit data starting from the $(I\_i)$-th bit is stored in a memory unit. Moreover, in the method of generating an encryption key disclosed in Literature 1; during the encryption key reproducing operation, of the PUF output data in the i-th round, data similar to the W-bit data stored in the memory unit is retrieved and accordingly the index data $I\_i$ is reproduced.

In this way, in the method of generating an encryption key disclosed in Literature 1; since only a single index data is taken into account in a single round, generation of an encryption key having a predetermined length requires repetitions of the round operation equal to the number of index data $I\_i$. Thus, in order to provide a sufficient amount of information to the encryption key, the required number of repetitions of the round operation becomes large. For example, in the method of generating an encryption key disclosed in Literature 1, in order to generate an encryption key having 128 bits, the index data I_i having 10 bits needs to be used in each round, and the round operation needs to be repeated for 16 times.

In contrast, in the encryption key generating apparatus 100 according to the first embodiment, a plurality of index data I_{i, j} can be generated or reproduced in a single round. As a result, in order to generate an encryption key having a predetermined length, the required number of repetitions of the round operation is smaller than the required number of repetitions of the round operation in the method of generating an encryption key disclosed in Literature 1. For example, in the encryption key generating apparatus 100 according to the first embodiment, while generating an encryption key having 128 bits; if four pieces of 10-bit index data I_{i, j} are used in each round, then only four repetitions of the round operation are sufficient to generate an encryption key having the same amount of information as the amount of information given in the method of generating an encryption key disclosed in Literature 1. In this way, as compared to the method of generating an encryption key disclosed in Literature 1, the encryption key generating apparatus 100 according to the first embodiment can have a decreased number of repetitions of the round operation, thereby making it possible to generate an encryption key in an efficient manner.

First Example

Figure 4:
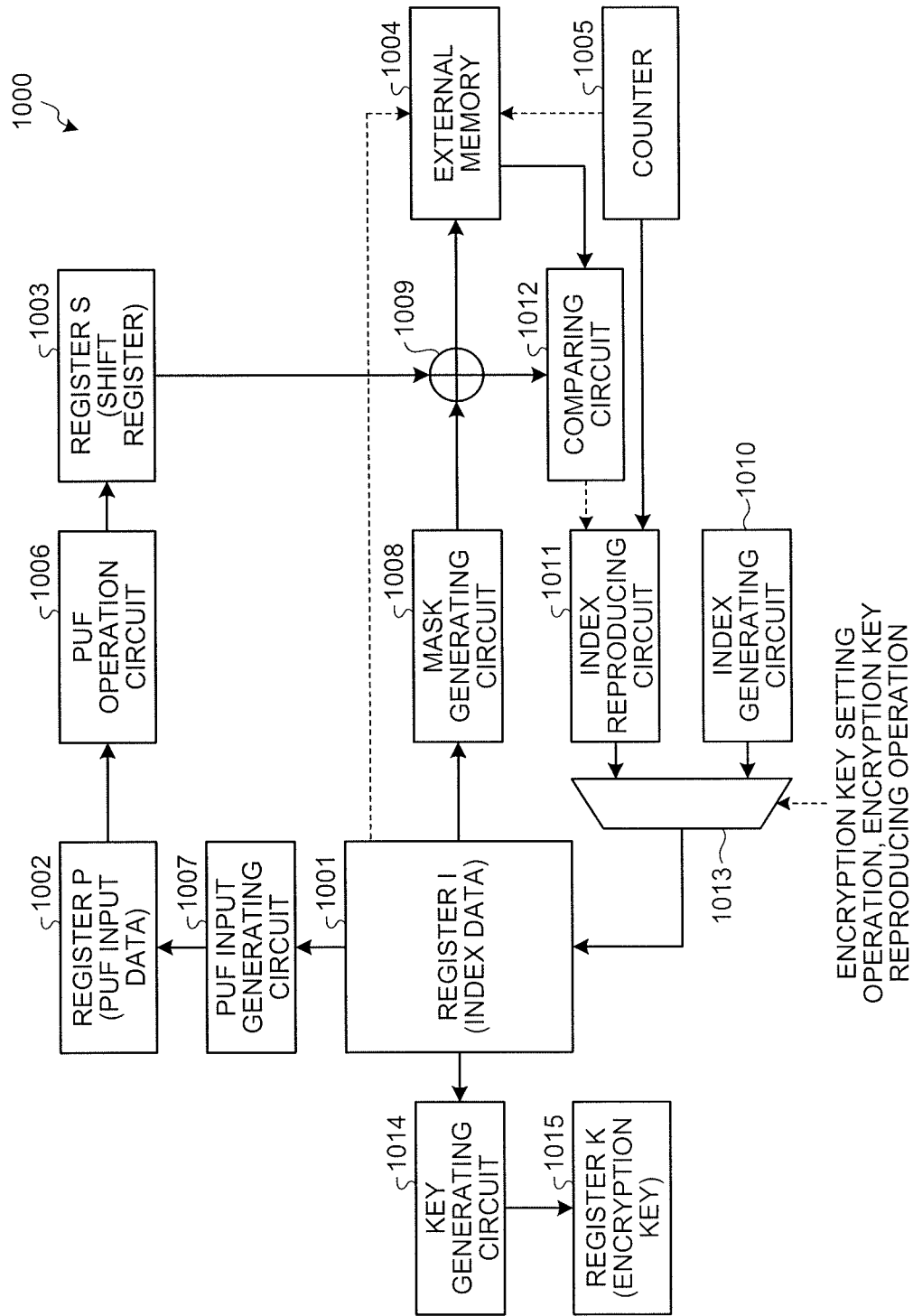
FIG. 4 is a block diagram of an encryption key generating apparatus according to a first example.

Explained below is the first example in which the encryption key generating apparatus 100 according to the first embodiment is put into practice. FIG. 4 is a block diagram of an encryption key generating apparatus 1000 according to the first example.

As illustrated in FIG. 4, the encryption key generating apparatus 1000 according to the first example includes four types of registers 1001, 1002, 1003, and 1015; an external memory 1004; a counter 1005; a PUF operation circuit 1006; a PUF input generating circuit 1007; a mask generating circuit 1008; an exclusive OR operation circuit 1009; an index generating circuit 1010; an index reproducing circuit 1011; a comparing circuit 1012; a selecting circuit 1013; and a key generating circuit 1014.

The register I 1001 is used to hold a plurality of index data. Herein, the register I 1001 can either hold a plurality of index data separately for each round r or hold the index data related to a plurality of rounds i=1, . . . , r in a collective manner.

The register P 1002 is used to hold the PUF input data that is to be input to the PUF operation circuit 1006. Meanwhile, in the case when the output of the PUF input generating circuit 1007 (described later) is input without modification to the PUF operation circuit 1006, then the encryption key generating apparatus 1000 need not include the register P 1002.

The register S 1003 is used to hold the PUF output data that is output by the PUF operation circuit 1006. More specifically, of the PUF output data output by the PUF operation circuit 1006, the register S 1003 holds W-bit data. Herein, the register S 1003 corresponds to the PUF output temporary memory unit 105 in the encryption key generating apparatus 100 according to the first embodiment.

The external memory 1004 is used to store deformation pattern data that is output by the exclusive OR operation circuit 1009. Herein, the external memory 1004 corresponds to the memory unit 102 in the encryption key generating apparatus 100 according to the first embodiment.

The counter 1005 counts the output bit count of the PUF operation circuit 1006 in each round, and accordingly stores a counter value cn.

The PUF operation circuit 1006 is an operation circuit on which is mounted the PUF 104 of the encryption key generating apparatus 100 according to the first embodiment. The PUF operation circuit 1006 considers PUF input data as the input and outputs PUF output data.

The PUF input generating circuit 1007 generates PUF input data, which is to be input to the PUF operation circuit 1006, based on the index data held in the register I 1001. Herein, the PUF input generating circuit 1007 corresponds to the PUF input generating unit 103 in the encryption key generating apparatus 100 according to the first embodiment.

The mask generating circuit 1008 is an operation circuit on which is mounted the MGF 107 of the encryption key generating apparatus 100 according to the first embodiment. Based on the index data held in the register I 1001, the mask generating circuit 1008 generates and outputs mask data.

The exclusive OR operation circuit 1009 performs an exclusive OR operation with respect to the PUF output data held in the register S 1003 and the mask data output by the mask generating circuit 1008. The exclusive OR operation circuit 1009 corresponds to the mask processing unit 108 in the encryption key generating apparatus 100 according to the first embodiment.

The index generating circuit 1010 generates, in each round r during the encryption key setting operation, N_r number of index data from 1 to L. During the encryption key reproducing operation the index reproducing circuit 1011 reproduces, as the index data, the value of the counter 1005 based on the output of the comparing circuit 1012 (described later). The index generating circuit 1010 and the index data reproducing circuit 1011 correspond to the index generating unit 106 in the encryption key generating apparatus 100 according to the first embodiment.

During the encryption key reproducing operation, the comparing circuit 1012 compares the deformation pattern data stored in the external memory 1004 with the output of the exclusive OR operation circuit 1009. If the deformation pattern data and the output of the exclusive OR operation circuit 1009 are determined to be similar data, then the comparing circuit 1012 outputs "1". Otherwise, the comparing circuit 1012 outputs "0".

During the encryption key setting operation, the selecting circuit 1013 selects the output of the index generating circuit 1010, and outputs it to the register I 1001. In contrast, during the encryption key reproducing operation, the selecting circuit 1013 selects the output of the index reproducing circuit 1011, and outputs it to the register I 1001.

The key generating circuit 1014 generates an encryption key based on the index data held in the register I 1001. The key generating circuit 1014 corresponds to the key generating unit 110 in the encryption key generating apparatus 100 according to the first embodiment.

The register K 1015 is used to hold the encryption key that is output by the key generating circuit 1014.

Meanwhile, in FIG. 4, in the encryption key generating apparatus 1000 according to the first example, only a single circuit of each type is disposed and only a single line is illustrated to connect two circuits. However, in order to generate or reproduce a plurality of index data in each round, it is desirable to dispose in parallel a plurality of mask generating circuits 1008, a plurality of exclusive OR operation circuits 1009, a plurality of index generating circuits 1010, a plurality of index reproducing circuits 1011, a plurality of comparing circuits 1012, and a plurality of selecting circuits 1013. Alternatively, the encryption key generating apparatus 1000 according to the first example can include only a single circuit of each type, but generate or reproduce a plurality of index data by means of time sharing.

Encryption Key Setting Operation According to First Example

Figure 5:
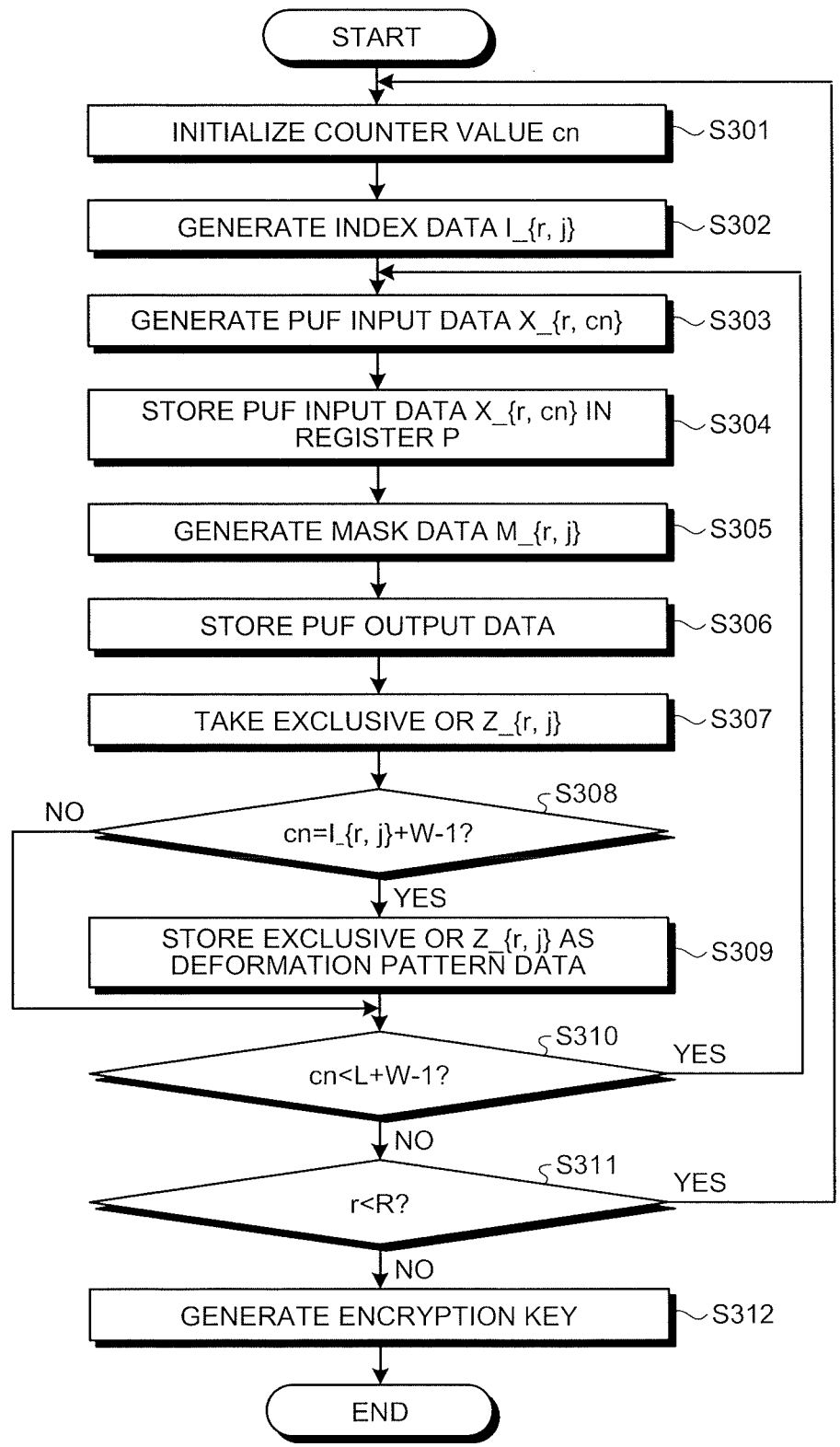
FIG. 5 is a flowchart for explaining a sequence of operations performed during an encryption key setting operation according to the first example.

Explained below with reference to FIG. 5 is the encryption key setting operation performed by the encryption key generating apparatus 1000 according to the first example. FIG. 5 is a flowchart for explaining a sequence of operations performed during the encryption key setting operation in the encryption key generating apparatus 1000 according to the first example.

The encryption key setting operation illustrated in the flowchart in FIG. 5 is started when the encryption key generating apparatus 1000 according to the first example receives an instruction to start the encryption key setting operation. Upon receiving the instruction to start the encryption key setting operation, the encryption key generating apparatus 1000 according to the first example initializes the round number r to "1" and repeats the following operations with respect to each of the round number r=1 to the round number r=R.

The counter 1005 initializes the counter value cn to "1" (Step S301).

The index generating circuit 1010 generates N_r number of index data, namely, index data I_{r, 1} to index data I_{r, N_r}, and stores those index data in the register I 1001 (Step S302). As long as the operation performed at Step S302 is performed before Step S306 (described later) at which the (W−1)-th bit of PUF output data output in the r-th round by the PUF operation circuit 1006 is stored in the register S 1003, the purpose is served. For example, the operation performed at Step S302 can be performed before the start of the operations for the r-th round.

Once the index data is stored in the register I 1001, the encryption key generating apparatus 1000 according to the first example repeats the following operations with respect to each of the counter value cn=1, cn=2, . . . , and cn=L+W−1.

The PUF input generating circuit 1007 considers, as the input, either a predetermined initial value or index data {I_{i, j}}_{0≤i≤r, 1≤j≤N_r} generated by the index data generating circuit 1010 at Step S302; and generates PUF input data X_{r, cn} that is used by the PUF operation circuit 1006 to output the cn-th bit in the r-th round (Step S303).

Then, the PUF input data X_{r, cn} generated by the PUF input generating circuit 1007 is stored in the register P 1002 (Step S304). As long as the operation performed at Step S304 is performed before Step S306 (described later) at which the PUF input data X_{r, cn} is input to the PUF operation circuit 1006, it serves the purpose. For example, the operation performed at Step S304 can be performed before the start of the operations for the r-th round.

Subsequently, regarding j=1 to j=N_r, the mask generating circuit 1008 generates mask data M_{r, j} by considering either a predetermined initial value or index data {I_{i, j}}_{0≤i≤r, 1≤j≤N_r}, which is generated by the index generating circuit 1010 and stored in the register I 1001, as the input as well as by considering "r" and "j" as the input (Step S305). As long as the operation performed at Step S305 is performed before Step S308 (described later) at which the exclusive OR operation circuit 1009 performs an exclusive OR operation, it serves the purpose. For example, the operation performed at Step S305 can be performed before the start of the operations for the r-th round.

Then, the register S 1003 considers the PUF input data X_{r, cn}, which is stored in the register P 1002 at Step S304, as the input and stores therein the PUF output data that is output by the PUF operation circuit 1006 (Step S306). Herein, in the encryption key generating apparatus 1000 according to the first example, it is assumed that, regarding each counter value cn, the PUF operation circuit 1006 outputs 1-bit data, and the register S 1003 shifts the already-stored data by one bit and then stores therein the 1-bit data newly output by the PUF operation circuit 1006.

The exclusive OR operation circuit 1009 takes an exclusive OR Z_{r, j} of the W-bit data stored in the register S 1003 and the mask data M_{r, j} output by the mask generating circuit 1008 (Step S307).

Then, the encryption key generating apparatus 1000 according to the first example determines whether or not the counter value cn of the counter 1005 matches with I_{r, j}+W−1 (Step S308). If the counter value cn of the counter 1005 matches with I_{r, j}+W−1 (Yes at Step S308), then the encryption key generating apparatus 1000 according to the first example stores the output Z_{r, j} of the exclusive OR operation circuit 1009 as the deformation pattern data in the external memory 1004 (Step S309). Herein, j is a number from to 1 to N_r. Meanwhile, if the counter value cn of the counter 1005 does not match with I_{r, j}+W−1 (No at Step S308), then the operation at Step S309 is not performed.

Then, the encryption key generating apparatus 1000 according to the first example determines whether or not the counter value cn of the counter 1005 is smaller than L+W−1 (Step S310). If the counter value cn of the counter 1005 is smaller than L+W−1 (Yes at Step S310), then the encryption key generating apparatus 1000 increments cn to cn+1. The system control then returns to Step S303 and the subsequent operations are repeated. On the other hand, if cn=L+W−1 is satisfied (No at Step S310), then the encryption key generating apparatus 1000 determines whether or not r<R is satisfied (Step S311). If r<R is satisfied (Yes at Step S311), then the encryption key generating apparatus 1000 increments r to r+1. The system control then returns to Step S301 and the subsequent operations are repeated. On the other hand, if r=R is satisfied (No at Step S311), then the system control proceeds to Step S312.

Subsequently, for example, the key generating circuit 1014 concatenates each of index data I_{i, j} included in the collection of index data {I_{I, j}}_{0≤i≤R, 1≤j≤N_i} stored in the register I 1001 in each round; generates an encryption key; and stores it in the register K 1015 (Step S312).

Encryption Key Reproducing Operation According to First Example

Figure 6:
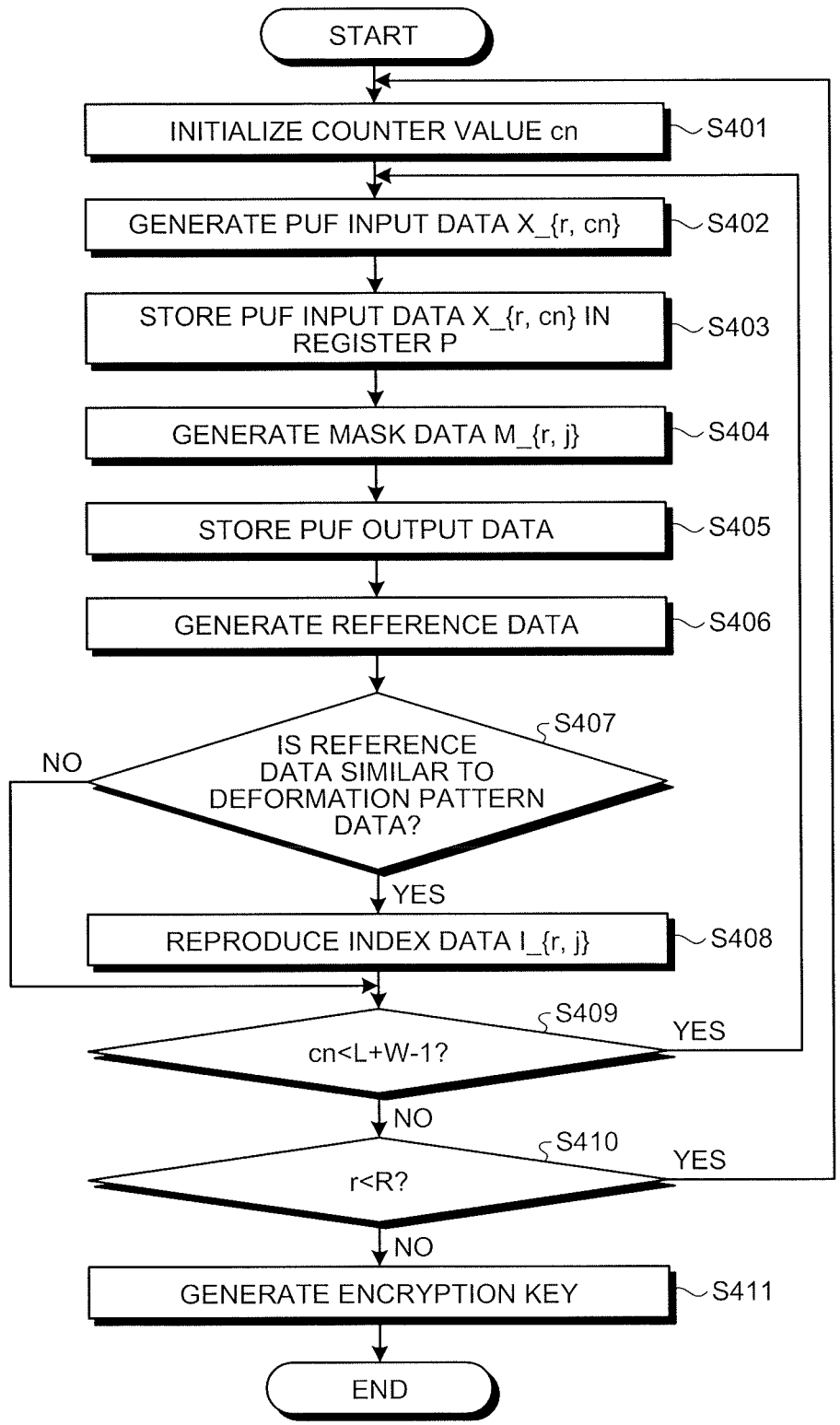
FIG. 6 is a flowchart for explaining a sequence of operations performed during an encryption key reproducing operation according to the first example.

Explained below with reference to FIG. 6 is the encryption key reproducing operation performed by the encryption key generating apparatus 1000 according to the first example. FIG. 6 is a flowchart for explaining a sequence of operations performed during the encryption key reproducing operation in the encryption key generating apparatus 1000 according to the first example.

The encryption key reproducing operation illustrated in the flowchart in FIG. 6 is started when the encryption key generating apparatus 1000 according to the first example receives an instruction to start the encryption key reproducing operation. Upon receiving the instruction to start the encryption key reproducing operation, the encryption key generating apparatus 1000 according to the first example initializes the round number r to "1" and repeats the following operations with respect to each of the round number r=1 to the round number r=R.

The counter 1005 initializes the counter value cn to "1" (Step S401).

Then, the encryption key generating apparatus 1000 according to the first example repeats the following operations with respect to each of the counter value cn=1, cn=2, . . . , and cn=L+W−1.

The PUF input generating circuit 1007 considers, as the input, either a predetermined initial value or index data $\{I\_\{i, j\}\}\_\{0 \le i \le r, 1 \le j \le N\_r\}$ that was reproduced in the previous round by the index reproducing circuit 1011; and generates PUF input data $X\_\{r, cn\}$ that is used by the PUF operation circuit 1006 to output the cn-th bit in the r-th round (Step S402).

Then, the PUF input data $X\_\{r, cn\}$ generated by the PUF input generating circuit 1007 is stored in the register P 1002 (Step S403). As long as the operation performed at Step S403 is performed before Step S405 (described later) at which the PUF input data $X\_\{r, cn\}$ is input to the PUF operation circuit 1006, it serves the purpose. For example, the operation performed at Step S403 can be performed before the start of the operations for the r-th round.

Subsequently, regarding j=1 to j=N_r, the mask generating circuit 1008 generates mask data $M\_\{r, j\}$ by considering either a predetermined initial value or index data $\{I\_\{i, j\}\}\_\{0 \le i \le r, 1 \le j \le N\_r\}$, which was reproduced in the previous round operation and stored in the register I 1001, as the input as well as by considering "r" and "j" as the input (Step S404). As long as the operation performed at Step S404 is performed before Step S406 (described later) at which the exclusive OR operation circuit 1009 calculates an exclusive OR that is the input for the comparing circuit 1012, it serves the purpose. For example, the operation performed at Step S404 can be performed before the start of the operations for the r-th round.

Then, the register S 1003 considers the PUF input data $X\_\{r, cn\}$, which is stored in the register P 1002 at Step S403, as the input and stores therein the PUF output data that is output by the PUF operation circuit 1006 (Step S405). Herein, in the encryption key generating apparatus 1000 according to the first example, it is assumed that, regarding each counter value cn, the PUF operation circuit 1006 outputs 1-bit data, and the register S 1003 shifts the already-stored data by one bit and then stores therein the 1-bit data newly output by the PUF operation circuit 1006.

The exclusive OR operation circuit 1009 takes an exclusive OR of the W-bit data stored in the register S 1003 and the mask data $M\_\{r, j\}$ output by the mask generating circuit 1008, and accordingly generates reference data that is to be compared with the deformation pattern data $Z\_\{r, i\}$ (Step S406).

Then, the comparing circuit 1012 determines whether or not the reference data generated at Step S406 is similar to the deformation pattern data $Z\_\{r, j\}$ stored in the external memory 1004 (Step S407).

If the comparing circuit 1012 determines that the two data are similar (Yes at Step S407); then, regarding the counter value cn stored in the counter 1005, the index reproducing circuit 1011 reproduces the index data $I\_\{r, j\}$ by considering $I\_\{r, j\}$=cn−W+1 (Step S408). That is, since the reference data that is determined to be similar to the deformation pattern data $Z\_\{r, j\}$ is the exclusive OR between the W-bit PUF output data, which has the start location as the location tracked back by W bits from the counter value cn of the counter 1005 and the mask data $M\_\{r, j\}$; the location tracked back by W bits from the counter value cn of the counter 1005 is reproduced as the index data $I\_\{r, j\}$. Meanwhile, if the comparing circuit 1012 determines that the two data are not similar (No at Step S407), then the operation at Step S408 is not performed.

Subsequently, the encryption key generating apparatus 1000 according to the first example determines whether or not the counter value cn of the counter 1005 is smaller than L+W−1 (Step S409). If the counter value cn of the counter 1005 is smaller than L+W−1 (Yes at Step S409), then the encryption key generating apparatus 1000 increments cn to cn+1. The system control then returns to Step S402 and the subsequent operations are repeated. On the other hand, if cn=L+W−1 is satisfied (No at Step S409), then the encryption key generating apparatus 1000 determines whether or not r<R is satisfied (Step S410). If r<R is satisfied (Yes at Step S410), then the encryption key generating apparatus 1000 increments r to r+1. The system control then returns to Step S401 and the subsequent operations are repeated. On the other hand, if r=R is satisfied (No at Step S410), then the system control proceeds to Step S411.

Then, for example, the key generating circuit 1014 concatenates each of index data $I\_\{i, j\}$ included in the collection of index data $\{I\_\{I, j\}\}\_\{0 \le i \le R, 1 \le j \le N\_i\}$ that is produced in each round by the index reproducing circuit 1011 and stored in each round in the register I 1001; generates an encryption key; and stores it in the register K 1015 (Step S411). Alternatively, the key generating circuit 1014 can generate an encryption key by concatenating not the collection of index data $\{I\_\{i, j\}\}\_\{0 \le i \le R, 1 \le j \le N\_i\}$ but the PUF input data $\{X\_\{r, cn\}\}\_\{1 \le r \le R\}$. Still alternatively, the key generating circuit 1014 can generate an encryption key by concatenating the PUF input data $\{X\_\{r, cn)\}\}\_\{1 \le r \le R\}$ in addition to concatenating the index data $\{I\_\{i, j\}\}\_\{0 \le i \le R, 1 \le j \le N\_i\}$. Meanwhile, the key generating circuit 1014 can either use the concatenated value as the encryption key or input the concatenated value in a hash function and use the obtained value as the encryption key.

Second Embodiment

General Description

Explained below is an overview of an encryption key generating apparatus according to a second embodiment. During the encryption key setting operation, the encryption key generating apparatus according to the second embodiment generates an encryption key with the use of confidential data; and stores, as pattern data, data obtained by cyclically bit-shifting the PUF output by an amount of shift indicated by the confidential data. Moreover, during the encryption key reproducing operation, the encryption key generating apparatus according to the second embodiment compares the PUF output with the pattern data that was stored, while cyclically bit-shifting the PUF output one bit every time (i.e., performs pattern matching) and, when the PUF output is similar to the pattern data, detects the amount of cyclic shift of the PUF output so as to reproduce the confidential data that was used in generating the encryption key during the encryption key setting operation. With that, the encryption key generating apparatus according to the second embodiment reproduces the encryption key.

Configuration

Figure 7:
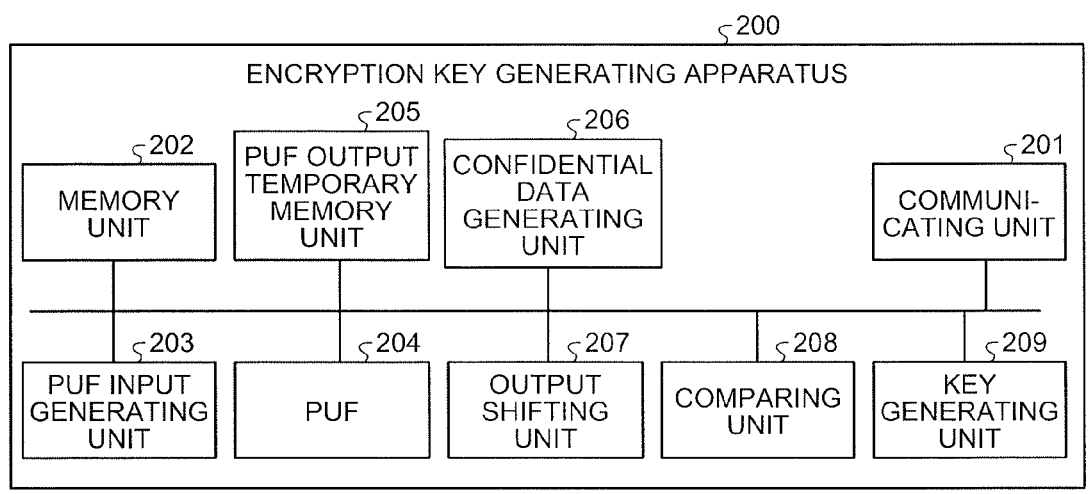
FIG. 7 is a functional block diagram illustrating a functional configuration of an encryption key generating apparatus according to a second embodiment.

Explained below with reference to FIG. 7 is an overall configuration of the encryption key generating apparatus according to the second embodiment. FIG. 7 is a functional block diagram illustrating a functional configuration of an encryption key generating apparatus 200 according to the second embodiment.

As illustrated in FIG. 7, the encryption key generating apparatus 200 according to the second embodiment includes a communicating unit 201, a memory unit 202, a PUF input generating unit 203, a PUF 204, a PUF output temporary memory unit 205, a confidential data generating unit 206, an output shifting unit 207, a comparing unit 208, and a key generating unit 209.

The communicating unit 201 is an interface that enables communication between the encryption key generating apparatus 200 and an external system.

The memory unit 202 is a memory used to store therein pattern data Z_r that is obtained by the output shifting unit 207 by cyclically bit-shifting PUF output data, which is output by the PUF 204, during the encryption key setting operation. The memory unit 102 is configured with, for example, a RAM or an EEPROM (registered trademark). Meanwhile, the memory unit 202 can be installed on the outside of the encryption key generating apparatus 200. When the memory unit 202 is installed on the outside of the encryption key generating apparatus 200, the constituent elements of the encryption key generating apparatus 200 perform data reading and data writing with respect to the memory unit 202 via the communicating unit 201.

The PUF input generating unit 203 generates PUF input data, which is to be input to the PUF 204, either on the basis of a predetermined initial value I_0 or on the basis of confidential data I_r output by the confidential data generating unit 206. For example, in order to ensure that the PUF input data has a predetermined length, the PUF input generating unit 203 concatenates predetermined data either to the initial value I_0 or to the confidential data I_r, and generates the PUF input data. Alternatively, the PUF input generating unit 203 can input the initial value I_0 or the confidential data I_r to a hash function and generate the PUF input data. Still alternatively, when the PUF input generating unit 203 receives input of a plurality of data, the PUF input generating unit 203 can either concatenate the input data or perform bit operations or arithmetic operations to generate the PUF input data.

The PUF 204 is a physically unclonable function. When a device is mounted, the physically unclonable function outputs a value specific to that device from the same input. An encryption key generating apparatus disclosed in Literature 1 makes use of a value obtained by performing an exclusive OR operation with respect to the output of a plurality of PUFs. In the following explanation, the PUF 204 either can be a circuit that outputs a value by performing an exclusive OR operation with respect to a plurality of PUFs and the output thereof, or can be a circuit that outputs a value by performing bit operations or arithmetic operations with respect to a plurality of PUFs and the output thereof. In each round, the PUF 204 receives input of the PUF input data generated by the PUF input generating unit 203 and outputs PUF output data having W bits.

The PUF output temporary memory unit 205 is used to temporarily store therein the PUF output data that is output in each round by the PUF 204. In the second embodiment, the PUF output temporary memory unit 205 is configured with a W-bit register.

The confidential data generating unit 206 generates a single confidential data I_r in each round. The confidential data I_r that is generated in each round by the confidential data generating unit 206 indicates an amount by which the output shifting unit 207 (described later) cyclically shifts the PUF output data. Meanwhile, the confidential data I_r can be received as a predetermined value by the communicating unit 201 from the outside of the encryption key generating apparatus 200. In that case, the encryption key generating apparatus 200 need not include the confidential data generating unit 206.

The output shifting unit 207 cyclically shifts PUF output data Y_r in each round r on the basis of the confidential data I_r. For example, the output shifting unit 207 either can cyclically shift the PUF output data Y_r to the left by I_r bits or can cyclically shift the PUF output data Y_r based on a predetermined rule and according to an amount of shift depending on the confidential data I_r.

During the encryption key reproducing operation, the comparing unit 208 compares the PUF output data, which is stored in the PUF output temporary memory unit 205, with the pattern data Z_r, which is stored by the memory unit 202 by cyclically bit-shifting the PUF output data; and detects the amount of cyclic shift when the PUF output data is similar to the pattern data Z_r. For example, the comparing unit 208 determines whether or not reference data Z'_r, which is obtained in a sequential manner by cyclically bit-shifting the PUF output data stored in the PUF output temporary memory unit 205 by one bit each time, is similar to the pattern data Z_r stored in the memory unit 202. The determination of whether or not two data are similar is identical to the explanation given in the first embodiment. Hence, that explanation is not repeated.

The key generating unit 209 generates an encryption key using a collection of R number of confidential data generated in each round. For example, the key generating unit 209 can generate an encryption key either by concatenating all of the R number of confidential data I_r or by performing bit operations or arithmetic operations with respect to the R number of confidential data I_r.

Given below is the explanation of the symbols that represent constant numbers used in the second embodiment. "W" represents the bit length of the PUF output data output by the PUF 204 as well as represents the largest value of the confidential data I_r that is generated in each round by the confidential data generating unit 206. "R" represents the total number of rounds carried out during the encryption key generating operation and the encryption key reproducing operation. "I_0" represents the initial value of the data that is input to the PUF input generating unit 203.

The encryption key generating apparatus 200 according to the second embodiment can have the hardware configuration of a commonplace computer that includes, for example, a processing device such as a CPU, a memory device such as a ROM or a RAM, an external memory device such as an HDD or a CD drive device, and a communicating device. The computer executes a computer program in such a way that the abovementioned hardware resources are used to implement the constituent elements including the communicating unit 201, the memory unit 202, the PUF input generating unit 203, the PUF 204, the PUF output temporary memory unit 205, the confidential data generating unit 206, the output shifting unit 207, the comparing unit 208, and the key generating unit 209.

Encryption Key Setting Operation

Figure 8:
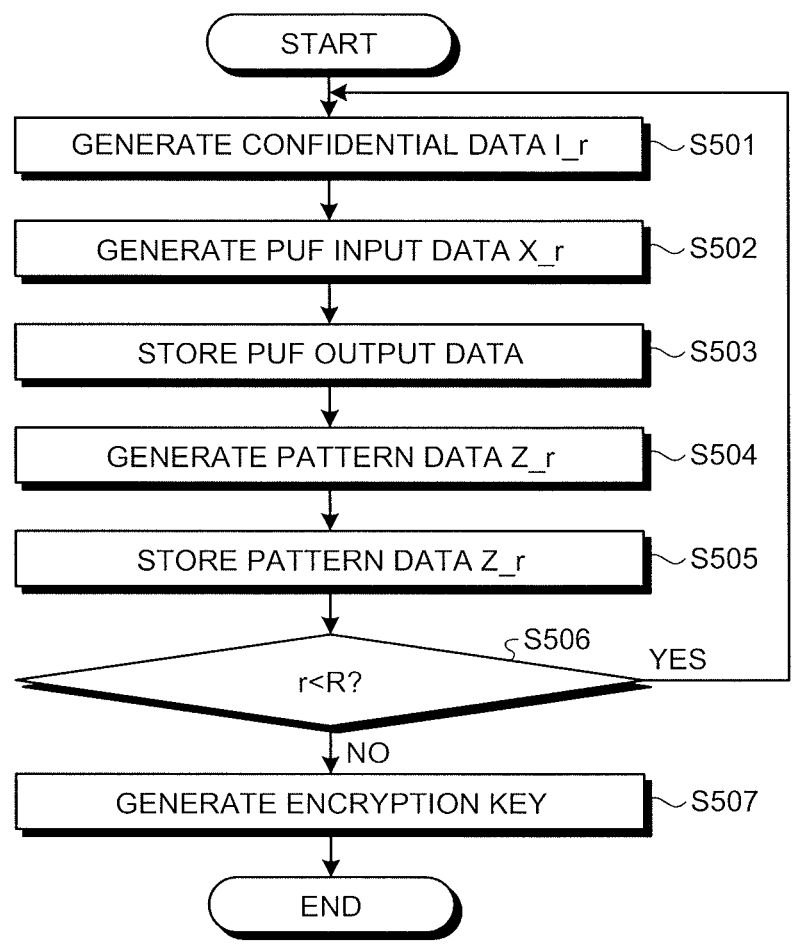
FIG. 8 is a flowchart for explaining a sequence of operations performed during an encryption key setting operation according to the second embodiment.

Explained below with reference to FIG. 8 is the encryption key setting operation performed in the encryption key generating apparatus 200 according to the second embodiment. FIG. 8 is a flowchart for explaining a sequence of operations performed during the encryption key setting operation in the encryption key generating apparatus 200.

The encryption key setting operation illustrated in the flowchart in FIG. 8 is started when the encryption key generating apparatus 200 receives an instruction to start the encryption key setting operation. Upon receiving the instruction to start the encryption key setting operation, the encryption key generating apparatus 200 initializes the round number r to "1" and repeats the following operations with respect to each of the round number r=1 to the round number r=R.

The confidential data generating unit 206 generates confidential data I_r (Step S501). The operation performed at Step S501 can be performed before the start of the operations for the r-th round.

The PUF input generating unit 203 considers, as the input, either a predetermined initial value or confidential data $\{I\_i\}\_\{0 \le i \le r\}$ generated by the confidential data generating unit 206 at Step S501; and generates PUF input data X_r that is used by the PUF 204 to output the PUF output data in the r-th round (Step S502). As long as the operation performed at Step S502 is performed before Step S503 (described later) at which the PUF input data X_r is input to the PUF 204, it serves the purpose. For example, the operation performed at Step S502 can be performed before the start of the operations for the r-th round.

The PUF output temporary memory unit 105 considers, as the input, the PUF input data X_r generated by the PUF input generating unit 203 at Step S502; and stores therein the W-bit PUF output data that is output by the PUF 204 (Step S503).

Then, for example, the output shifting unit 207 cyclically shifts the PUF output data, which has been stored in the PUF output temporary memory unit 205 at Step S503, to the left by an amount of shift indicated by the confidential data I_r, which has been generated by the confidential data generating unit 206 at Step S501; and generates pattern data Z_r (Step S504).

Subsequently, the pattern data Z_r generated by the output shifting unit 207 at Step S504 is stored in the memory unit 202 (Step S505).

Once the pattern data Z_r is stored in the memory unit 202, the encryption key generating apparatus 200 determines whether or not r<R is satisfied (Step S506). If r<R is satisfied (Yes at Step S506), then the encryption key generating apparatus 200 increments r to r+1. The system control then returns to Step S501 and the subsequent operations are repeated. On the other hand, if r=R is satisfied (No at Step S506), then the system control proceeds to Step S507.

Then, the key generating unit 209 generates an encryption key by, for example, concatenating the R number of confidential data I_r (Step S507).

Encryption Key Reproducing Operation

Figure 9:
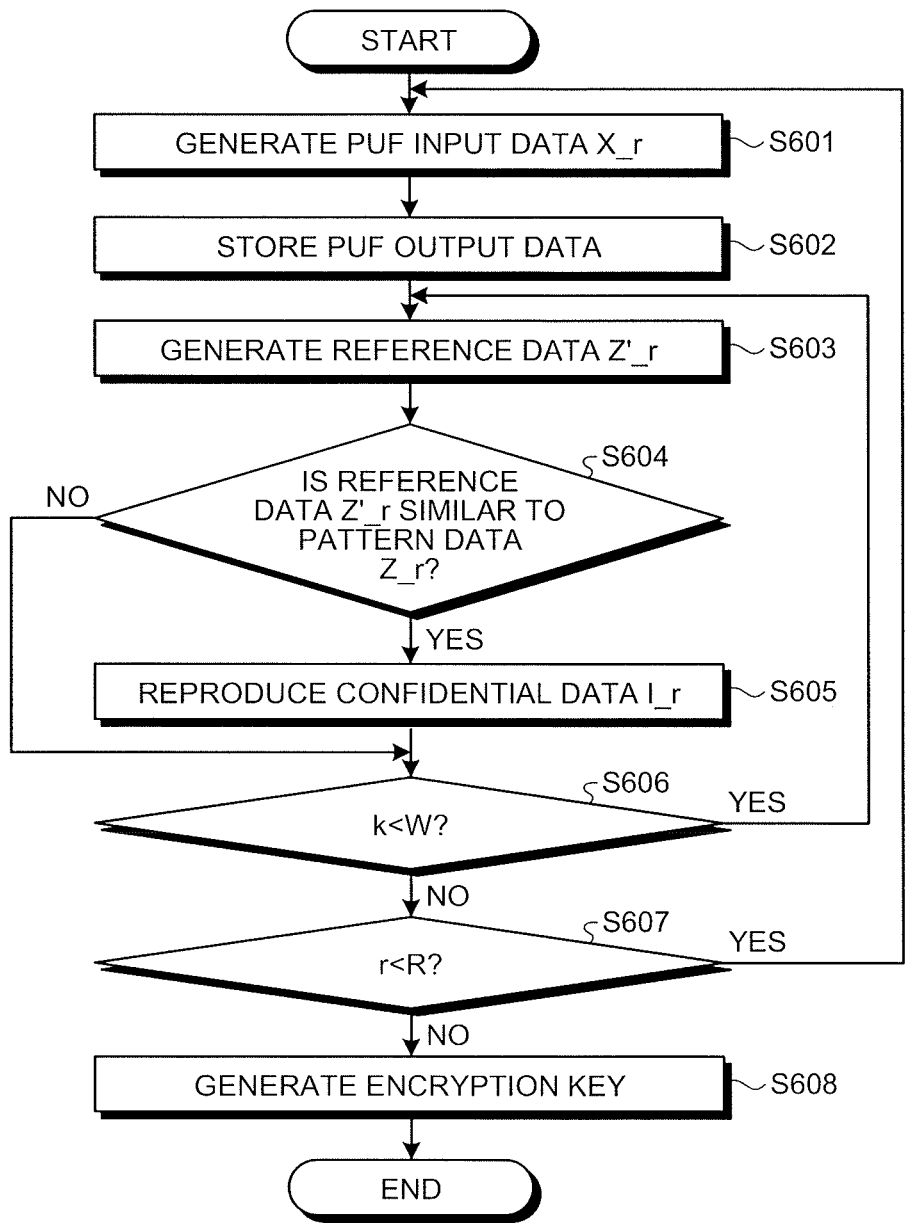
FIG. 9 is a flowchart for explaining a sequence of operations performed during an encryption key reproducing operation according to the second embodiment.

Explained below with reference to FIG. 9 is the encryption key reproducing operation performed by the encryption key generating apparatus 200 according to the second embodiment. Once the encryption key setting operation is completed as described above, the encryption key reproducing operation is performed when a cryptographic protocol demands for the encryption key. FIG. 9 is a flowchart for explaining the sequence of operations performed during the encryption key reproducing operation in the encryption key generating apparatus 200.

The encryption key reproducing operation illustrated in the flowchart in FIG. 8 is started when the encryption key generating apparatus 200 receives an instruction to start the encryption key reproducing operation. Upon receiving the instruction to start the encryption key reproducing operation, the encryption key generating apparatus 200 initializes the round number r to "1" and repeats the following operations with respect to each of the round number r=1 to the round number r=R.

The PUF input generating unit 203 considers, as the input, either a predetermined initial value or the confidential data $\{I\_i\}\_\{0 \le i \le r\}$ that was reproduced in the previous round operation; and generates PUF input data X_r that is used by the PUF 204 to output the PUF output data in the r-th round (Step S601). As long as the operation performed at Step S601 is performed before Step S603 (described later) at which the PUF input data X_r is input to the PUF 204, the purpose is served. For example, the operation performed at Step S601 can be performed before the start of the operations for the r-th round.

The PUF output temporary memory unit 205 considers, as the input, the PUF input data X_r generated by the PUF input generating unit 203 at Step S601; and stores therein the PUF output data output by the PUF 204 (Step S602).

Once the PUF output data is stored in the PUF output temporary memory unit 205; then, regarding k=1 to k=W, the encryption key generating apparatus 200 repeatedly performs the following operations from Step S603 to Step S606 with respect to the PUF output data stored in the PUF output temporary memory unit 205.

Then, for example, the output shifting unit 207 cyclically shifts the PUF output data, which is stored in the PUF output temporary memory unit 205, to the left by k bits and generates the reference data Z'_r (Step S603).

Subsequently, the comparing unit 208 determines whether or not the reference data Z'_r generated by the output shifting unit 207 at Step S603 is similar to the pattern data Z_r stored in the memory unit 202 (Step S604). Alternatively, the comparing unit 208 can determine whether or not the data that is obtained by performing shifting with respect to the pattern data Z_r, which is stored in the memory unit 202, in the opposite direction to the direction of shifting performed by the output shifting unit 207 while generating the pattern data Z'_r is similar to the PUF output data stored in the PUF output temporary memory unit 205.

If the comparing unit 208 determines that the two data are similar (Yes at Step S604), then the encryption key generating apparatus 200 reproduces the confidential data I_r by considering I_r=k (Step S605). That is, as the confidential data I_r, the encryption key generating apparatus 200 reproduces a cyclic shift k of the PUF output data until the reference data Z'_r, which is determined to be similar to the pattern data Z_r stored in the memory unit 202, appears. Meanwhile, if the comparing unit 208 determines that the two data are not similar (No at Step S604), then the operation at Step S605 is not performed.

Then, the encryption key generating apparatus 200 determines whether or not k<W is satisfied (Step S606). If k<W is satisfied (Yes at Step S606), then the encryption key generating apparatus 200 increments k to k+1. The system control then returns to Step S603 and the subsequent operations are repeated. Meanwhile, regarding k=1 to k=W, if there exists such confidential data I_r that cannot be reproduced even after repeating the operations from Step S603 to Step S606; then the encryption key generating apparatus 200 can either stop performing the operations or can set a predetermined value or a random value to the confidential data I_r that cannot be reproduced.

If the determination result at Step S606 indicates that k=W is satisfied (No at Step S606), then the encryption key generating apparatus 200 determines whether or not r<R is satisfied (Step S607). If r<R is satisfied (Yes at Step S607), then the encryption key generating apparatus 200 increments r to r+1. The system control then returns to Step S601 and the subsequent operations are repeated. On the other hand, if r=R is satisfied (No at Step S607), then the system control proceeds to Step S608.

Subsequently, for example, the key generating unit 209 concatenates the R number of confidential data I_r reproduced in each round, and generates an encryption key (Step S608). Alternatively, the key generating unit 209 can generate an encryption key by concatenating not the confidential data I_r but the PUF input data $\{X\_r\}\_\{1 \le r \le R\}$. Still alternatively, the key generating unit 209 can generate an encryption key by concatenating the PUF input data $\{X\_r\}\_\{1 \le r \le R\}$ in addition to concatenating the confidential data I_r. Meanwhile, the key generating unit 209 can either use the concatenated value as the encryption key or input the concatenated value in a hash function and use the obtained value as the encryption key.

Moreover, in the encryption key generating apparatus 200 according to the second embodiment, based on the confidential data I_r, the PUF input generating unit 203 generates the PUF input data X_r that is to be input to the PUF 204. However, alternatively, as the PUF input data X_r, the PUF input generating unit 203 can also generate, for example, a fixed value that is not dependent on the confidential data I_r, such as an activation signal meant for the PUF 204.

Furthermore, in the encryption key generating apparatus 200 according to the second embodiment, the PUF 204 outputs W-bit PUF output data in each round. However, alternatively, the configuration can be such that the PUF 204 outputs the PUF output data of more than W bits, and some of that PUF output data is used in each round. For example, at Step S505 illustrated in FIG. 8, of the data obtained by cyclically bit-shifting the PUF output data, the first V bits (V<W) can be used as the pattern data Z_r. Still alternatively, the configuration can be such that, when the PUF 204 outputs the PUF output data of more than W bits, the PUF output temporary memory unit 205 concatenates the first V bits (V<W) of the PUF output data with the remaining (W−V) bits and stores therein the concatenated data. That is followed by the execution of the subsequent operations. Still alternatively, the configuration can be such that, for example, when the PUF input data X_r having a fixed value is input to the PUF 204 and when the PUF outputs PUF output data having (R×W) bits; then, in the i-th round, PUF output data starting from the ((I−1)×W)-th bit to the W-th bit is stored in the PUF output temporary memory unit 205. That is followed by the execution of the subsequent operations.

Meanwhile, in the encryption key generating apparatus 200 according to the second embodiment, in the case when the PUF input generating unit 203 generates a fixed value that is not dependent on the confidential data I_r, such as an activation signal meant for the PUF 204, as the PUF input data X_r; it becomes possible to update the encryption key in each round in the following manner. During the encryption key setting operation, the output shifting unit 207 generates the pattern data Z_r by cyclically bit-shifting the PUF output data. Consequently, pattern data Z_1 to pattern data Z_R gets stored in the memory unit 202. In order to update the encryption key, the pattern data Z_r stored in the memory unit 202 is replaced with a value Z_r' that is obtained by cyclically bit-shifting the pattern data Z_r by Δ_r. Thus, Z_r' is a value obtained by cyclically bit-shifting the PUF output data by I_r+Δ_r. Hence, during the encryption key reproducing operation, an encryption key is generated on the basis of $\{I\_r+\Delta\_r\}\_\{1 \le r \le R\}$. That is, the encryption key based on $\{I\_r\}\_\{1 \le r \le R\}$ can be updated to the encryption key based on $\{I\_r+\Delta\_r\}\_\{1 \le r \le R\}$.

Effect of Second Embodiment

In the method of generating an encryption key disclosed in Literature 1, the PUF output is set to be sufficiently long, and only a portion of that output is stored in the memory unit and is used in generating and reproducing an encryption key. For example, in the method of generating an encryption key disclosed in Literature 1, "L" is set to have 1024 bits and "W" is set to have 256 bits. Hence, in each round, the PUF has to output 1379 bits.

Thus, in the method of generating an encryption key disclosed in Literature 1, since 256-bit data is stored in the memory unit in each round, the PUF has to output 1379 bits in each round. As a result, the use efficiency of the PUF is poor.

In contrast, in the encryption key generating apparatus 200 according to the second embodiment, the configuration is such that the PUF 204 outputs the PUF output data having W bits in each round, and the pattern data that is obtained by cyclically bit-shifting the PUF output data is stored in the memory unit 202. As a result, as compared to the method of generating an encryption key disclosed in Literature 1, the PUF output data generated in each round can be shorter in length. For example, when "W" is of 256 bits, the PUF output data having 1379 bits needs to be output in the method of generating an encryption key disclosed in Literature 1. In comparison, in the encryption key generating apparatus 200 according to the second embodiment, the output bit count of the PUF 204 decreases to about one-fifth in each round. In this way, as compared to the method of generating an encryption key disclosed in Literature 1, the encryption key generating apparatus 200 according to the second embodiment can reduce the PUF output and generate an encryption key in an efficient manner.

Second Example

Figure 10:
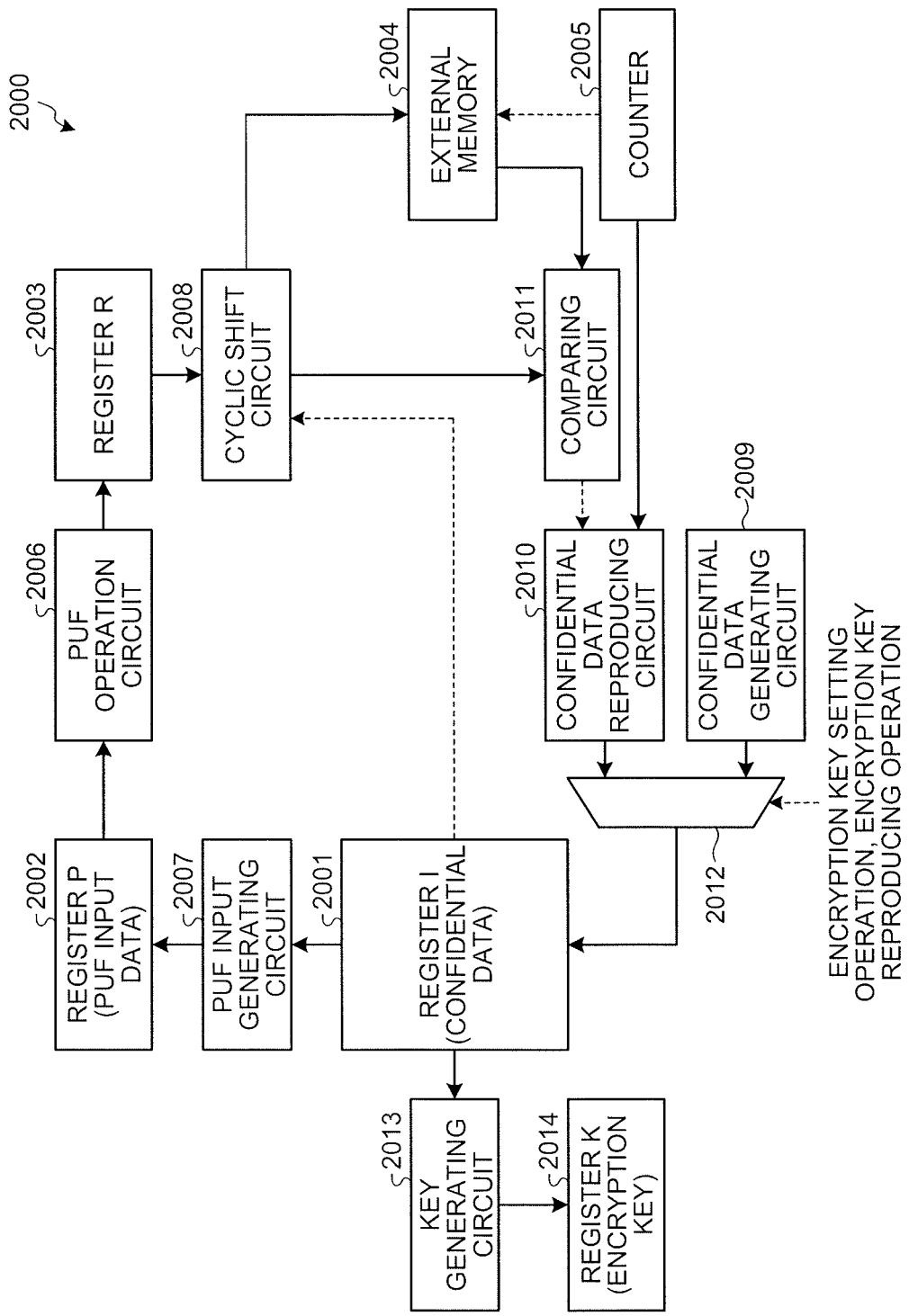
FIG. 10 is a block diagram of an encryption key generating apparatus according to a second example.

Explained below is a second example in which the encryption key generating apparatus 100 according to the second embodiment is put into practice. FIG. 10 is a block diagram of an encryption key generating apparatus 2000 according to the second example.

As illustrated in FIG. 10, the encryption key generating apparatus 2000 according to the second example includes four types of registers 2001, 2002, 2003, and 2014; an external memory 2004; a counter 2005; a PUF operation circuit 2006; a PUF input generating circuit 2007; a cyclic shift circuit 2008; a confidential data generating circuit 2009; a confidential data reproducing circuit 2010; a comparing circuit 2011; a selecting circuit 2012; and a key generating circuit 2013.

The register I 2001 is used to hold confidential data. Herein, the register I 2001 can either hold a single confidential data separately for each round r or hold the confidential data related to a plurality of rounds i=1, . . . , r in a collective manner.

The register P 2002 is used to hold the PUF input data that is to be input to the PUF operation circuit 2006. Meanwhile, when the output of the PUF input generating circuit 2007 (described later) is input without modification to the PUF operation circuit 2006, then the encryption key generating apparatus 2000 need not include the register P 2002.

The register R 2003 is used to hold the PUF output data output by the PUF operation circuit 2006. Herein, the register S 1003 is used to hold the W-bit PUF output data having that is output by the PUF operation circuit 2006. Meanwhile, the register R 2003 corresponds to the PUF output temporary memory unit 205 in the encryption key generating apparatus 200 according to the second embodiment.

The external memory 2004 is used to store therein pattern data that is output by the cyclic shift circuit 2008. Herein, the external memory 2004 corresponds to the memory unit 202 in the encryption key generating apparatus 200 according to the second embodiment.

The counter 2005 counts the amount of cyclic shift performed in each round with respect to the PUF output data by the cyclic shift circuit 2008, and accordingly stores therein the counter value cn.

The PUF operation circuit 2006 is an operation circuit on which is mounted the PUF 204 of the encryption key generating apparatus 200 according to the second embodiment. The PUF operation circuit 2006 considers PUF input data as the input and outputs PUF output data.

The PUF input generating circuit 2007 generates PUF input data, which is to be input to the PUF operation circuit 2006, based on the confidential data held in the register I 2001. Herein, the PUF input generating circuit 2007 corresponds to the PUF input generating unit 203 in the encryption key generating apparatus 200 according to the second embodiment.

The cyclic shift circuit 2008 cyclically shifts the W-bit PUF output data, which is stored in the register R 2003, by a value indicated by the confidential data, which is stored in the register I 2001; and generates pattern data to be stored in the external memory 2004. The cyclic shift circuit 2008 corresponds to the output shifting unit 207 in the encryption key generating apparatus 200 according to the second embodiment. Meanwhile, it is also possible to combine the register R 2003 and the cyclic shift circuit 2008, and the cyclically bit-shifting of the PUF output data can be performed inside the register R 2003. Alternatively, every time the PUF operation circuit 2006 outputs a single bit, the PUF output data can be written, while being cyclically shifted, in the register R 2003 at the address indicated by the confidential data.

The confidential data generating circuit 2009 generates a single confidential data in each round r during the encryption key setting operation. The confidential data reproducing circuit 2010 reproduces, as the confidential data, the value of the counter 2005 based on the comparing circuit 2011 (described later) during the encryption key reproducing operation. The confidential data generating circuit 2009 and the confidential data reproducing circuit 2010 correspond to the confidential data generating unit 206 in the encryption key generating apparatus 200 according to the second embodiment.

During the encryption key reproducing operation, the comparing circuit 2011 compares the pattern data stored in the external memory 2004 with the reference data output by the cyclic shift circuit 2008. If the pattern data is determined to be similar to the reference data, then the comparing circuit 2011 outputs "1". Otherwise, the comparing circuit 2011 outputs "0".

During the encryption key setting operation, the selecting circuit 2012 selects the output of the confidential data generating circuit 2009 and outputs it to the register I 2001. In contrast, during the encryption key reproducing operation, the selecting circuit 2012 selects the output of the confidential data reproducing circuit 2010 and outputs it to the register I 2001.

The key generating circuit 2013 generates an encryption key based on the confidential data held in the register I 2001. The key generating circuit 2013 corresponds to the key generating unit 209 in the encryption key generating apparatus 200 according to the second embodiment.

The register K 2014 is used to hold the encryption key that is output by the key generating circuit 2013.

Encryption Key Setting Operation According to Second Example

Explained below with reference to FIG. 11 is the encryption key setting operation performed by the encryption key generating apparatus 2000 according to the second example. FIG. 11 is a flowchart for explaining a sequence of operations performed during the encryption key setting operation in the encryption key generating apparatus 2000 according to the second example.

The encryption key setting operation illustrated in the flowchart in FIG. 11 is started when the encryption key generating apparatus 2000 according to the second example receives an instruction to start the encryption key setting operation. Upon receiving the instruction to start the encryption key setting operation, the encryption key generating apparatus 2000 according to the second example initializes the round number r to "1" and repeats the following operations with respect to each of the round number r=1 to the round number r=R.

The counter 2005 initializes the counter value cn to "1" (Step S701).

The confidential data generating circuit 2009 generates confidential data I_r and stores it in the register I 2001 (Step S702). For example, the operation performed at Step S702 can be performed before the start of the operations for the r-th round.

The PUF input generating circuit 2007 considers, as the input, either a predetermined initial value or the confidential data I_r that is generated by the confidential data generating circuit 2009 at Step S702; generates PUF input data X_r; and stores it in the register P 2002 (Step S703). For example, the operation performed at Step S703 can be performed before the start of the operations for the r-th round.

Then, the register R 2003 considers the PUF input data X_r, which is stored in the register P 2002 at Step S703, as the input and stores therein the W-bit PUF output data output by the PUF operation circuit 2006 (Step S704).

Once the W-bit PUF output data is stored in the register R 2003, the encryption key generating apparatus 2000 according to the second example repeats the following operations from Step S705 to Step S708 with respect to each of the counter value cn=1, cn=2, . . . , and cn=W.

The cyclic shift circuit 2008 cyclically shifts the PUF output data, which is stored in the register R 2003, to the left one bit every time (Step S705). Every time the PUF output data is shifted to the left by one bit due to the operation performed at Step S705, the counter value cn of the counter 2005 is incremented.

The encryption key generating apparatus 2000 according to the second example determines whether or not the counter value cn of the counter 2005 matches with the confidential data I_r, that is, determines whether or not PUF output data has been cyclically shifted by an amount of shift indicated by the confidential data I_r (Step S706). If the counter value cn of the counter 2005 matches with the confidential data I_r (Yes at Step S706), then the output of the cyclic shift circuit 2008 is stored as pattern data in the external memory 2004 (Step S707). On the other hand, if the counter value cn of the counter 2005 does not match with the confidential data I_r (No at Step S706), then the operation at Step S707 is not performed.

Then, the encryption key generating apparatus 2000 according to the second example determines whether or not the counter value cn of the counter 2005 is smaller than W (Step S708). If the counter value cn of the counter 2005 is smaller than W (Yes at Step S708), then the system control returns to Step S705 and the subsequent operations are repeated. On the other hand, if cn=W is satisfied (Yes at Step S708), then the encryption key generating apparatus 2000 according to the second example determines whether or not r<R is satisfied (Step S709). If r<R is satisfied (Yes at Step S108), then the encryption key generating apparatus 2000 increments r to r+1. The system control then returns to Step S701 and the subsequent operations are repeated. On the other hand, if r=R is satisfied (No at Step S709), then the system control proceeds to Step S710.

Then, for example, the key generating circuit 2013 concatenates each of confidential data I_r included in the collection of confidential data $\{I\_i\}\_\{0 \le i \le R\}$ stored in the register I 2001 in each round; generates an encryption key; and stores it in the register K 2014 (Step S710).

Encryption Key Reproducing Operation According to Second Example

Explained below with reference to FIG. 12 is the encryption key reproducing operation performed by the encryption key generating apparatus 2000 according to the second example. FIG. 12 is a flowchart for explaining a sequence of operations performed during the encryption key reproducing operation in the encryption key generating apparatus 2000 according to the second example.

The encryption key reproducing operation illustrated in the flowchart in FIG. 12 is started when the encryption key generating apparatus 2000 according to the second example receives an instruction to start the encryption key reproducing operation. Upon receiving the instruction to start the encryption key reproducing operation, the encryption key generating apparatus 2000 according to the second example initializes the round number r to "1" and repeats the following operations with respect to each of the round number r=1 to the round number r=R.

The counter 1005 initializes the counter value cn to "1" (Step S801).

The PUF input generating circuit 2007 considers, as the input, either a predetermined initial value or confidential data $\{I\_i\}\_\{0 \le i \le r\}$ reproduced by the confidential data reproducing circuit 2010 in the previous round operation; generates PUF input data X_r; and stores it in the register P 2002 (Step S802). For example, the operation performed at Step S802 can be performed before the start of the operations for the r-th round.

Then, the register R 2003 considers the PUF input data X_r, which is stored in the register P 2002 at Step S802, as the input and stores therein the W-bit PUF output data output by the PUF operation circuit 2006 (Step S803).

Once the W-bit PUF output data is stored in the register R 2003, the encryption key generating apparatus 2000 according to the second example repeats the following operations from Step S804 to Step S807 with respect to each of the counter value cn=1, cn=2, . . . , and cn=W.

The cyclic shift circuit 2008 cyclically shifts the PUF output data, which is stored in the register R 2003, to the left one bit every time, and generates reference data Z'_r that is to be compared with the pattern data (Step S804). In the operation performed at Step S804, every time the PUF output data is shifted to the left by one bit and a new reference data is generated, the counter value cn of the counter 2005 is incremented.

Subsequently, the comparing circuit 2011 determines whether or not the reference data Z'_r generated at Step S804 is similar to the pattern data Z_r stored in the external memory 2004 (Step S805).

If the comparing circuit 2011 determines that the two data are similar (Yes at Step S805); then the confidential data reproducing circuit 2010 reproduces the counter value cn, which is stored by the counter 1005, as the confidential data I_r (Step S806). That is, since the reference data Z'_r, which is determined to be similar to the pattern data Z_r, is the data obtained by cyclically bit-shifting the PUF output data by the amount of cyclic shift indicated by the counter value cn of the counter 2005; the amount of cyclic shift indicated by the counter value cn of the counter 2005 is reproduced as the confidential data I_r. Meanwhile, if the comparing circuit 2011 determines that the two data are not similar (No at Step S805), then the operation at Step S806 is not performed.

Then, the encryption key generating apparatus 2000 determines whether or not the counter value cn of the counter 2005 is smaller than W (Step S807). If the counter value cn of the counter 2005 is smaller than W (Yes at Step S807), then the system control returns to Step S804 and the subsequent operations are repeated. On the other hand, if cn=W is satisfied (Yes at Step S807), then the encryption key generating apparatus 2000 determines whether or not r<R is satisfied (Step S808). If r<R is satisfied (Yes at Step S808), then the encryption key generating apparatus 2000 increments r to r+1. The system control then returns to Step S801 and the subsequent operations are repeated. On the other hand, if r=R is satisfied (No at Step S808), then the system control proceeds to Step S809.

Then, for example, the key generating circuit 2013 concatenates each of confidential data I_r included in the collection of confidential data $\{I\_\}\_\{0 \le i \le R\}$ that is reproduced in each round by the confidential data reproducing circuit 2010 and that is stored in the register I 2001; generates an encryption key; and stores it in the register K 2014 (Step S809). Alternatively, the key generating circuit 2013 can generate an encryption key by concatenating not the confidential data $\{I\_i\}\_\{0 \le i \le R\}$ but the PUF input data $\{X\_r\}\_\{1 \le r \le R\}$. Still alternatively, the key generating circuit 2013 can generate an encryption key by concatenating the PUF input data $\{X\_r\}\_\{1 \le r \le R\}$ in addition to concatenating the confidential data $\{I\_i\}\_\{0 \le i \le R\}$. Meanwhile, the key generating circuit 2013 can either use the concatenated value as the encryption key or input the concatenated value in a hash function and use the obtained value as the encryption key.

Meanwhile, the encryption key generating apparatus according to the first embodiment and the second embodiment as well as according to the specific examples of the embodiments can be put into practice using the hardware configuration of a commonplace computer, which executes a computer program so as to implement the constituent elements described above.

The computer program for implementing the constituent elements of the encryption key generating apparatus is recorded in the form of an installable or executable file on a computer-readable recording medium such as a compact disk read only memory (CD-ROM), a flexible disk (FD), a compact disk recordable (CD-R), or a digital versatile disk (DVD).

Alternatively, the computer program for implementing the constituent elements of the encryption key generating apparatus can be saved in a downloadable manner on a computer connected to the Internet. Still alternatively, the computer program for implementing the constituent elements of the encryption key generating apparatus can be distributed over a network such as the Internet. Still alternatively, the computer program for implementing the constituent elements of the encryption key generating apparatus can be stored in advance, for example, in a ROM.

The computer program for implementing the constituent elements of the encryption key generating apparatus contains modules for each of the abovementioned constituent elements. In practice, for example, a CPU (processor) reads the computer program from the recording medium mentioned above and runs it so that the computer program is loaded in main memory device. As a result, the module for each constituent element of the encryption key generating apparatus is generated in the main memory device.

As described above in detail along with specific examples, the encryption key generating apparatus according to the embodiments makes it possible to generation an encryption key in an efficient manner with the use of a physically unclonable function.

Meanwhile, the first embodiment, the second embodiment, and the specific examples of the embodiments can be suitably combined to form various modifications. For example, the encryption key generating apparatus 200 according to the second embodiment can be configured to include the MGF 107 and the mask processing unit 108, so that the PUF output data that has been cyclically shifted can be subjected to mask processing and stored in the memory unit 102. Moreover, the encryption key generating apparatus 200 according to the second embodiment can be configured to generate or reproduce a plurality of confidential data in each round.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An encryption key generating apparatus that generates an encryption key during an encryption key setting operation and reproduces the encryption key during an encryption key reproducing operation, the apparatus comprising:
   a converting circuit configured to convert input data with the use of a physically unclonable function and output data;
   a confidential data generating circuit configured to generate confidential data that indicates an amount of cyclic shift applied to the output data;
   an output shifting circuit configured to cyclically shift the output data by the amount of cyclic shift indicated by the confidential data;
   a memory control circuit to store the cyclically shifted output data as pattern data in a memory;
   a comparing circuit configured to, while cyclically shifting the output data, compare reference data, which is obtained in a sequential manner by cyclically bit-shifting the output data by one bit each time, with the pattern data and determine whether or not the reference data is similar to the pattern data so as to detect an amount of cyclic shift at the time when the reference data is similar to the pattern data, wherein
   on the basis of the amount of cyclic shift detected by the comparing circuit, the confidential data is reproduced;
   during the encryption key setting operation using the converting circuit, the confidential data generating circuit, the output shifting circuit, and the memory control circuit, the apparatus generates one encryption key by using a total round number, R, of confidential data that are generated through R times of round operations and stores R number of pattern data in the memory, and
   during the encryption key reproducing operation using the converting circuit and the comparing circuit, the apparatus reproduces the one encryption key by using the R number of confidential data that are reproduced through the R times of round operations.

2. A computer program product comprising a non-transitory computer-readable medium containing a computer program for generating an encryption key during an encryption key setting operation and reproducing the encryption key during an encryption key reproducing operation, the computer program causes a computer to execute:
   converting input data with the use of a physically unclonable function and outputting output data;
   generating confidential data that indicates an amount of cyclic shift applied to the output data;
   cyclically shifting the output data by the amount of cyclic shift indicated by the confidential data;
   storing the cyclically shifted output data as pattern data in a memory; and
   comparing, while cyclically shifting the output data, reference data, which is obtained in a sequential manner by cyclically bit-shifting the output data by one bit each time, with the pattern data and determining whether or not the reference data is similar to the pattern data so as to detect an amount of cyclic shift at the time when the output data is similar to the pattern data, wherein
   on the basis of the amount of cyclic shift detected at the comparing, the confidential data is reproduced;
   during the encryption key setting operation including the converting, the generating of the confidential data, the cyclically shifting, and the storing, the computer program causes the computer to execute generating one encryption key by using a total round number, R, of confidential data that are generated through R times of round operations and storing R number of pattern data in the memory, and
   during the encryption key reproducing operation including the converting and the comparing, the computer program causes the computer to execute reproducing the one encryption key by using the R number of confidential data that are reproduced through the R times of round operations.

3. An encryption key generating apparatus that generates an encryption key during an encryption key setting operation and reproduces the encryption key during an encryption key reproducing operation, the apparatus comprising:
   processing circuitry configured to operate as:
   a converting unit configured to convert input data with the use of a physically unclonable function and output data;
   a confidential data generating unit configured to generate confidential data that indicates an amount of cyclic shift applied to the output data;
   an output shifting unit configured to cyclically shift the output data by the amount of cyclic shift indicated by the confidential data;
   a memory controller to store the cyclically shifted output data as pattern data in a memory; and
   a comparing unit configured to, while cyclically shifting the output data, compare reference data, which is obtained in a sequential manner by cyclically bit-shifting the output data by one bit each time, with the pattern data and determine whether or not the reference data is similar to the pattern data so as to detect an amount of cyclic shift at the time when the reference data is similar to the pattern data, wherein on the basis of the amount of cyclic shift detected by the comparing unit, the confidential data is reproduced;

during the encryption key setting operation using the converting unit, the confidential data generating unit, the output shifting circuit unit, and the memory controller, the apparatus generates one encryption key by using a total round number, R, of confidential data that are generated through R times of round operations and stores R number of pattern data in the memory, and during the encryption key reproducing operation using the converting unit and the comparing unit, the apparatus reproduces the one encryption key by using the R number of confidential data that are reproduced through the R times of round operations.

* * * * *